United States Patent
Bradley

(10) Patent No.: US 8,493,261 B2
(45) Date of Patent: Jul. 23, 2013

(54) COUNTERMEASURE DEVICE FOR A MOBILE TRACKING DEVICE

(71) Applicant: Timothy Bradley, Loogootee, IN (US)

(72) Inventor: Timothy Bradley, Loogootee, IN (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 13/621,538

(22) Filed: Sep. 17, 2012

(65) Prior Publication Data
US 2013/0015374 A1 Jan. 17, 2013

Related U.S. Application Data

(63) Continuation of application No. 12/541,772, filed on Aug. 14, 2009, now Pat. No. 8,305,252.

(51) Int. Cl.
| H04K 3/00 | (2006.01) |
| G01S 7/38 | (2006.01) |
| G01S 7/495 | (2006.01) |
| G01S 7/00 | (2006.01) |
| F41G 7/22 | (2006.01) |

(52) U.S. Cl.
USPC ............ 342/14; 342/13; 342/52; 342/53; 342/54; 455/1; 244/3.1; 244/3.15; 244/3.16; 398/39; 372/109

(58) Field of Classification Search
USPC ............ 455/1; 89/1.11; 244/3.1–3.19, 1 R, 244/118.2, 129.1, 137.4; 342/13–20, 52–56, 342/59, 61–68, 73–81, 175; 250/493.1–504 H, 250/200, 206, 206.1–206.3, 330, 334; 356/3, 356/4.01, 27, 28, 138, 139.04, 625, 635; 701/1, 701/3; 398/39; 372/109
See application file for complete search history.

(56) References Cited

U.S. PATENT DOCUMENTS

| 4,575,786 A | 3/1986 | Roberts |
| 4,618,224 A * | 10/1986 | Smith ......................... 89/1.11 |
| 4,838,167 A | 6/1989 | Prahauser et al. |
| 4,905,937 A | 3/1990 | Spotswood et al. |
| 5,007,736 A * | 4/1991 | Daniel et al. ................ 244/3.16 |

(Continued)

FOREIGN PATENT DOCUMENTS

| FR | 2318453 A | 3/1977 |
| WO | WO9907439 | 2/1999 |
| WO | WO2006031351 | 3/2006 |

OTHER PUBLICATIONS

Brown, J.M., "Digital Model of a Generic Infrared Tracker," Thesis in partial fulfillment of requirements for Master of Science in Electrical Engineering, May 1992, cover and pp. i-vii, 1-26, and 66-71 (available in Library of Rose Hulman Institute of Technology), Indiana.

(Continued)

*Primary Examiner* — Bernarr Gregory
(74) *Attorney, Agent, or Firm* — Christopher A. Monsey

(57) ABSTRACT

A countermeasure device for directing a mobile tracking device away from an asset is provided. The countermeasure device includes a continuous wave laser source whose output is directed at a seeker head of the mobile tracking device. The countermeasure device causes the generation of localized sources within the mobile tracking device and confuses the mobile tracking device as to the true location of the asset.

6 Claims, 20 Drawing Sheets

U.S. PATENT DOCUMENTS

| | | | |
|---|---|---|---|
| 5,142,288 A | | 8/1992 | Cleveland |
| 5,198,607 A | | 3/1993 | Livingston et al. |
| 5,200,622 A | * | 4/1993 | Rouchon et al. ............... 250/334 |
| 5,378,155 A | | 1/1995 | Eldridge |
| 5,401,171 A | | 3/1995 | Paghdiwala |
| 5,600,434 A | | 2/1997 | Warm et al. |
| 5,703,314 A | * | 12/1997 | Meeker ........................ 89/1.11 |
| 5,742,384 A | | 4/1998 | Farmer |
| 5,748,321 A | * | 5/1998 | Burks et al. .................... 356/635 |
| 5,780,807 A | | 7/1998 | Saunders |
| 5,793,476 A | | 8/1998 | Laakmann et al. |
| 5,793,477 A | | 8/1998 | Laakmann |
| 6,359,710 B1 | | 3/2002 | Takken et al. |
| 6,422,508 B1 | * | 7/2002 | Barnes ......................... 244/3.16 |
| 6,429,446 B1 | | 8/2002 | Labaugh |
| 6,439,888 B1 | | 8/2002 | Boutoussov et al. |
| 6,480,140 B1 | | 11/2002 | Rosefsky |
| 6,587,486 B1 | | 7/2003 | Sepp et al. |
| 6,658,985 B2 | * | 12/2003 | Aumont et al. ............... 244/3.16 |
| 6,662,700 B2 | * | 12/2003 | O'Neill ......................... 89/1.11 |
| 6,697,008 B1 | | 2/2004 | Sternowski |
| 6,705,573 B2 | * | 3/2004 | McDonnell ................... 89/1.11 |
| 6,779,753 B2 | | 8/2004 | Baumann et al. |
| 6,801,550 B1 | | 10/2004 | Snell |
| 6,873,893 B1 | | 3/2005 | Sanghera et al. |
| 6,903,674 B2 | | 6/2005 | Hoesel et al. |
| 6,929,214 B2 | | 8/2005 | Ackleson et al. |
| 6,969,845 B2 | | 11/2005 | von Rosenberg, Jr. |
| 6,977,598 B2 | | 12/2005 | Longbottom |
| 7,017,467 B1 | | 3/2006 | Monroe |
| 7,053,812 B2 | | 5/2006 | Trainor |
| 7,196,301 B2 | | 3/2007 | Thomas et al. |
| 7,378,626 B2 | | 5/2008 | Fetterly |
| 7,504,982 B2 | | 3/2009 | Berg et al. |
| 7,521,655 B2 | | 4/2009 | Kisletsov et al. |
| 7,523,692 B1 | * | 4/2009 | Burns ............................ 89/1.11 |
| 7,540,227 B2 | | 6/2009 | McCants, Jr. |
| 7,683,310 B1 | | 3/2010 | Sinclair et al. |
| 7,688,247 B2 | | 3/2010 | Anschel et al. |
| 7,760,333 B2 | | 7/2010 | Akerlund |
| 7,920,255 B2 | * | 4/2011 | Aphek et al. ............. 356/139.04 |
| 7,943,914 B2 | * | 5/2011 | Chicklis et al. ............ 250/495.1 |
| 8,054,451 B2 | * | 11/2011 | Karazi et al. ................. 356/4.01 |
| 8,212,709 B2 | * | 7/2012 | Bradley ........................... 342/14 |
| 8,217,375 B2 | * | 7/2012 | Keegan et al. ............ 250/504 R |
| 8,305,252 B2 | * | 11/2012 | Bradley ........................... 342/14 |
| 2002/0190162 A1 | | 12/2002 | McDonnell |
| 2005/0065668 A1 | | 3/2005 | Sanghera et al. |
| 2006/0000988 A1 | | 1/2006 | Stuart et al. |
| 2007/0075182 A1 | | 4/2007 | Fetterly |
| 2007/0169616 A1 | | 7/2007 | Vickory |
| 2007/0236382 A1 | | 10/2007 | Dove |
| 2008/0018519 A1 | | 1/2008 | Berg et al. |
| 2008/0018520 A1 | | 1/2008 | Moreau |
| 2008/0074306 A1 | | 3/2008 | Akerlund |
| 2008/0088496 A1 | | 4/2008 | Thum-Jaeger et al. |
| 2008/0144673 A1 | | 6/2008 | Gapontsev |
| 2009/0084252 A1 | | 4/2009 | Marquis et al. |
| 2009/0092157 A1 | | 4/2009 | Gapontsev |
| 2009/0122816 A1 | | 5/2009 | Wagler et al. |
| 2009/0189785 A1 | | 7/2009 | Kravitz et al. |

OTHER PUBLICATIONS

Dornheim, M.A., "Cost of Protection," Aviation Week, 2008, 2 pgs., downloaded from website http://aviationweek.com/aw/generic/story_generic.jsp?channel=awst&id=news/11145p3.xml.

globalsecurity.org, "Large Aircraft Infrared Countermeasures (LAIRCM)," 3 pgs., downloaded from http://ww.globalsecurity.org/military/systems/aircraft/systems/laircm.htm12/9/2008.

Matthews, W., "New Angle on Missile Defense; U.S. Overcomes Cost Obstacles With UAV-based Infrared Sensor," Defense News, Sep. 29, 2008, 3 pgs., downloaded Dec. 5, 2008 from http://www.defensenews.com/story.php?i=3746183.

Osborn, K., "Army looks to field laser jammer by 2010," Army Times, May 12, 2007, 2 pgs., downloaded from http://www.armtimes.com/new/2007/08/defense_bae_jammer_070511a/12/5/2008.

Raytheon Company, "Scorpion Aircraft Protection System; Lightweight, Cost-Effective Missile Protection for Tactical Aircraft," 2006, 2 pgs.

Peavey et al., "Comparison of Cortical Bone Ablations by Using Infrared Laser Wavelengths 2.9 to 9.2 μm," Lasers in Surgery and Medicine, vol. 26, pp. 421-434, 1999.

* cited by examiner

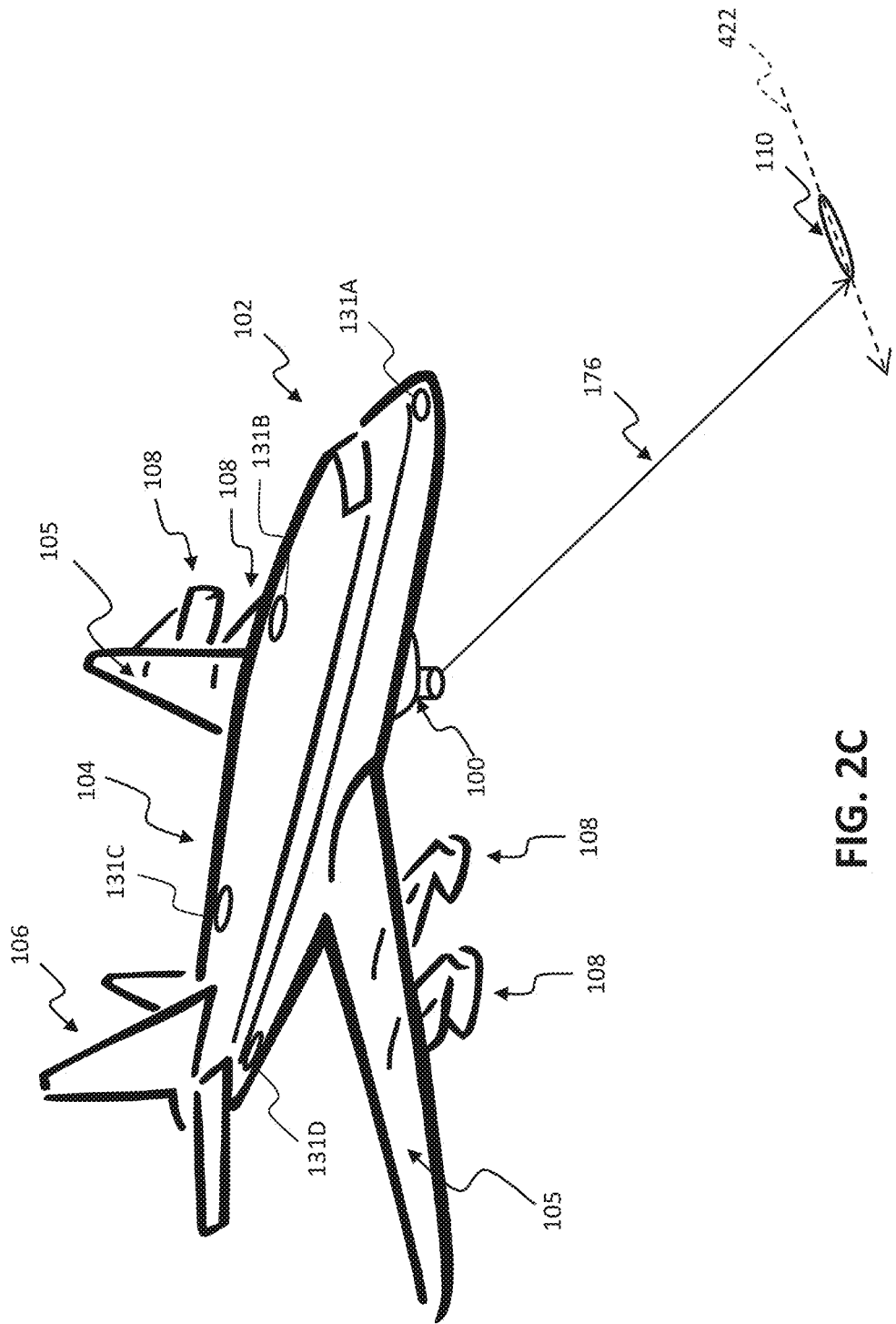

COUNTERMEASURE DEVICE FOR A MOBILE TRACKING DEVICE

CROSS-REFERENCE TO RELATED APPLICATION

This application is a continuation of U.S. patent application Ser. No. 12/541,772, filed Aug. 14, 2009, now U.S. Pat. No. 8,305,252, the disclosures of which are expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon.

BACKGROUND OF THE INVENTION

The present invention relates generally to a countermeasure device which causes a mobile tracking device to not approach closer to an asset, and more particularly, to a countermeasure device which directs the mobile tracking device away from the asset or disables the tracking device.

Presently, a multitude of mobile tracking devices are known which identify an asset and attempt to move closer to the asset and potentially contact the asset. Examples of mobile tracking devices include infrared based mobile tracking devices which examine the infrared energy which is emitted by the asset and detected by the mobile tracking device. These infrared mobile tracking devices alter their direction of travel to track the highest infrared energy being detected within their field of view. Such mobile tracking devices may rely on a non-imaging detection system or an imaging detection system.

There are several countermeasures available to misdirect a mobile infrared tracking device away from an asset. One exemplary countermeasure device is infrared hot bodies which appear brighter to the mobile infrared tracking device than the asset. These infrared hot bodies may be expelled by the asset. The mobile tracking device detects the brighter infrared hot bodies and follows the hot bodies as they become further spaced apart from the asset; thereby directing the mobile infrared tracking device away from the asset. Exemplary infrared hot bodies include flares.

Another type of countermeasure device is a laser jamming device. Laser jamming devices are most effective against non-imaging mobile tracking devices. Laser jamming devices direct a pulsed or modulated laser signal at a detection system of the mobile tracking device. The pulsed or modulated laser signal is tailored to the specific characteristics of the mobile tracking device. An example of one laser jammer which is capable of jamming multiple types of tracking devices by varying a period of the modulated laser signal is disclosed in U.S. Pat. No. 6,359,710. Another exemplary laser jamming system is the AN/AAQ-24 Nemesis DIRCM system provided by Northrup Grumman Corporation located in Los Angeles, Calif.

SUMMARY OF THE INVENTION

In an exemplary embodiment of the present disclosure, a countermeasure device is disclosed. In another exemplary embodiment, a method of interacting with a mobile tracking device is disclosed. In yet another exemplary embodiment of the present disclosure, an apparatus for interacting with a mobile tracking device is provided. The apparatus comprising: a plurality of sensor modules which monitor the environment; a first controller portion operatively connected to the plurality of sensor modules, the first controller portion determining a presence of the mobile tracking device in the environment based on information collected by the plurality of sensor modules and a current location of the mobile tracking device; and a countermeasure system. The countermeasure system including a second controller portion which receives the current location of the mobile tracking device from the first controller portion, orients a tracking system of the countermeasure system based on the current location of the mobile tracking device, detects the mobile tracking device, updates the location of the mobile tracking device, activates a continuous wave laser, and directs a continuous beam of optical energy at the mobile tracking device.

In a further exemplary embodiment, a method for keeping a mobile tracking device away from an asset is provided. The mobile tracking device having a seeker head which is directed at an asset due to the infrared energy radiated by the asset. The method comprising the steps of: directing an output of a continuous wave laser at the seeker head along a first direction of travel of the mobile tracking device, the output of the continuous wave laser being infrared energy; and propagating the infrared energy from the continuous wave laser into the seeker head of the mobile tracking device to generate at least one localized source within the mobile tracking device and within a field of view of the mobile tracking device which indicates a second direction of travel for the mobile tracking device.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings.

FIG. 2C illustrates the mobile tracking device changing its direction of travel to a third direction due to the optical energy directed from the countermeasure device at the mobile tracking device;

FIG. 8 illustrates a processing sequence for charging the battery source of the countermeasure device;

Figure 1:
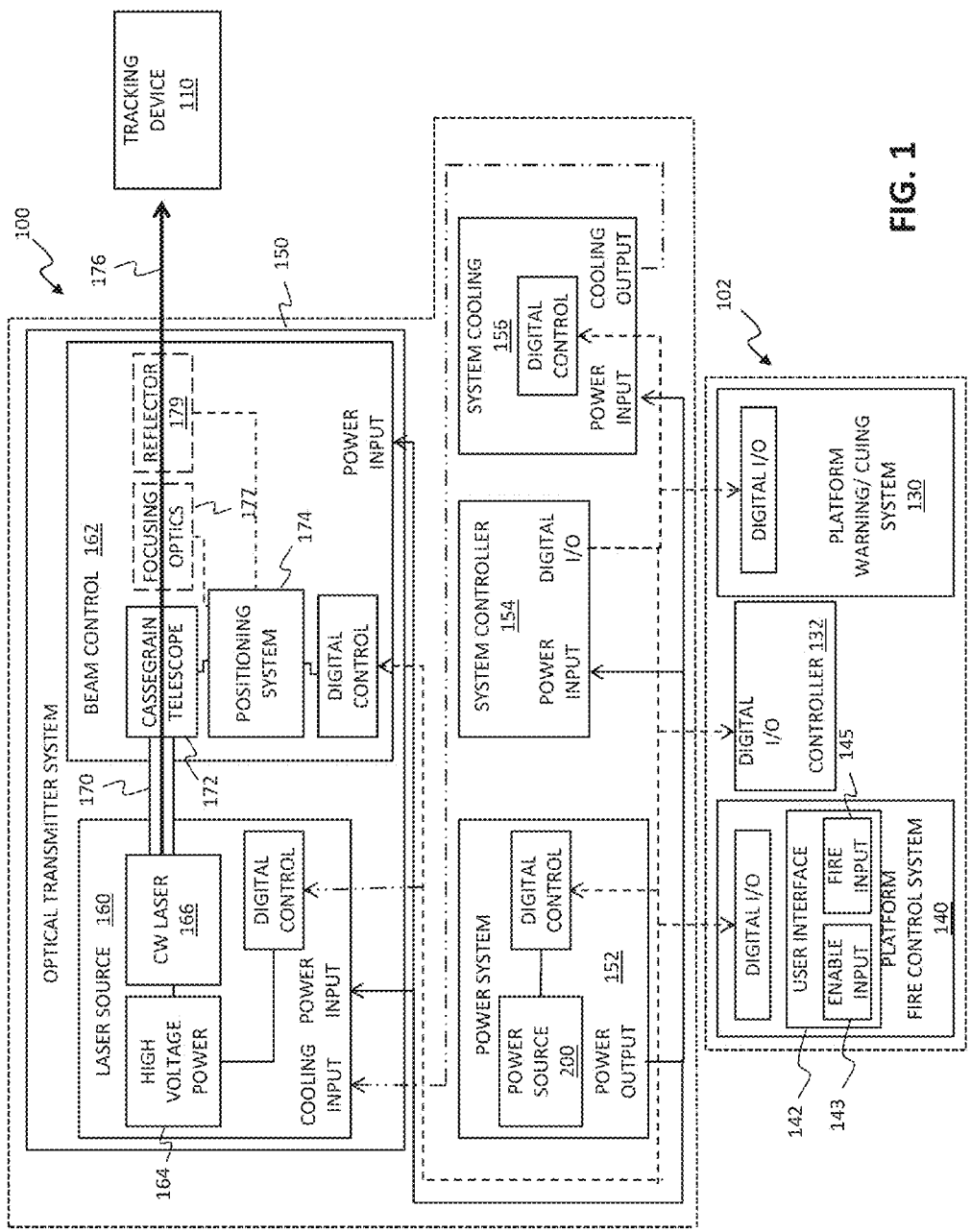
FIG. 1 illustrates a representative view of a countermeasure device and associated asset.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

The present disclosure is directed to countermeasure devices which are implemented to protect aircraft, such as commercial airlines and military aircraft. However, the principles discussed herein are applicable to other types of assets. Exemplary assets include moveable assets, such as aircraft, ships, buses, or trucks, or land based assets, such as an airport, factory, building, or facility.

Referring to FIG. 1, a countermeasure device 100 is shown. Countermeasure device 100 is coupled to an asset 102. For purposes of discussion, asset 102 is considered to be an airplane, such as the airplane designated 102 in FIG. 2. However, the present disclosure is contemplated for use with a multitude of different assets. Airplane 102 includes a body or fuselage 104, a pair of main wings 105, tail wings 106, and a plurality of propulsion devices 108. Exemplary propulsion devices include jet engines, internal combustion engines with associated propellers, and any other suitable engine arrangement.

Figure 3:
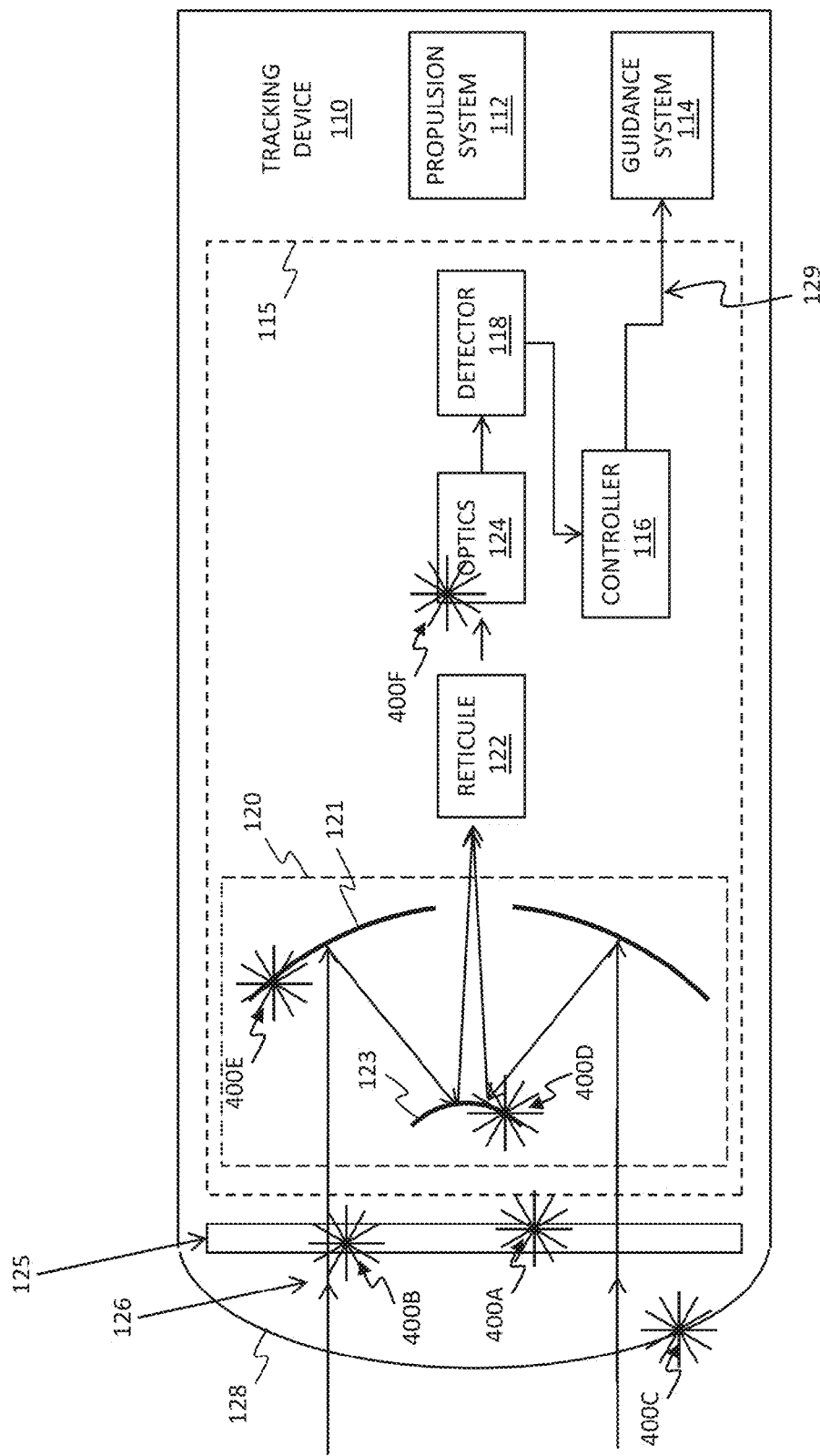
FIG. 3 illustrates an exemplary mobile tracking device.

Referring to FIG. 3, components of a mobile tracking device 110 are shown. Mobile tracking device 110 includes a propulsion system 112 which provides power to propel mobile tracking device 110. Exemplary propulsion systems include solid fuel rockets, engines, and any other suitable devices for providing power to mobile tracking device 110.

Mobile tracking device 110 also includes a guidance system 114 which controls the direction of travel of mobile tracking device 110. Exemplary guidance system components include wings for an airborne mobile tracking device 110, a rudder for a marine mobile tracking device 110, and ground engaging members for a land based mobile tracking device 110. The guidance system 114 steers mobile tracking device 110 to change a direction of travel of mobile tracking device 110. Exemplary airborne tracking devices include rockets, airplanes, and other flying devices. Exemplary marine tracking devices include boats (see FIG. 11), submersible devices, and other marine devices. Exemplary land based tracking devices include wheeled devices, tracked devices, and other suitable land based devices.

Mobile tracking device 110 includes a controller 116 which controls the operation of propulsion system 112 and guidance system 114. Mobile tracking device 110 also includes a gimbaled seeker head 115 which is able to move independent of the remainder of mobile tracking device 110. Seeker head 115 supports controller 116, a detector 118, telescope 120, a reticule 122, and optics 124.

In operation, electromagnetic radiation 126 from the environment enters an optical window 128 of mobile tracking device 110. Optical window 128 may be a dome. Optical window 128 may be selected to only pass electromagnetic radiation 126 within a certain wavelength band. For instance, in the case of an infrared mobile tracking device 110, optical window 128 may only pass electromagnetic radiation 126 within the infrared spectrum or a portion of the infrared spectrum. In other embodiments, a separate filter 125 is included somewhere within the optical setup of mobile tracking device 110 to limit the range of wavelengths of electromagnetic radiation 126 passed on to detector 118. Filter 125 is shown between optical window 128 and telescope 120. However, filter 125 may be positioned anywhere between optical window 128 and detector 118.

The electromagnetic radiation 126 is received by telescope 120. Telescope 120 includes a primary mirror 121 which focuses the electromagnetic radiation 126 towards a secondary mirror 123. Secondary mirror 123 in turn focuses the electromagnetic radiation 126 towards reticule 122. Reticule 122 spins to provide a modulated signal of the electromagnetic radiation. Optics 124 receives and focus the modulated signal of the electromagnetic radiation 126 passing through reticule 122 onto detector 118 which is a non-imaging detector.

Controller 116 receives input from detector 118 which is used by controller 116 to determine the location the brightest object in the environment, typically asset 102. The modulated signal allows controller 116 to discriminate between background electromagnetic radiation and the radiation of asset 102, as well as, determine the location of asset 102 relative to a direction of travel of mobile tracking device 110. Based on this input from detector 118, controller 116 determines a desired direction of travel for mobile tracking device 110 which corresponds to tracking device 110 heading towards asset 102. Seeker head 115 is adjusted to center the brightest object in the environment so that seeker head 115 is pointed directly at the brightest object. Controller 116 provides this adjustment of seeker head 115 (from its intended orientation in line with the direction of travel of mobile tracking device 110) to guidance system 114 as error signal 129. Guidance system 114 uses this error signal 129 to alter the direction of travel of mobile tracking device 110. Over time, if mobile tracking device 110 is tracking asset 102 mobile tracking device 110 will be pointed at asset 102 and seeker head 115 generally produces a small error signal which is indicative of mobile tracking device 110 being aligned to intercept asset 102.

In the embodiment illustrated in FIG. 3, mobile tracking device 110 includes a spinning reticule 122. In another embodiment, mobile tracking device 110 does not include reticule 122 but rather secondary mirror 123 is tilted and telescope 120 is spun to produce a signal for controller 116. In one embodiment, detector 118 is an imaging detector and controller 116 processes the images from detector 118 to determine the location of asset 102.

Returning to FIG. 2, airplane 102 includes warning/cuing system 130 which detects when a mobile tracking device 110 has been launched and/or is tracking airplane 102. Warning/cuing system 130 includes sensor modules 131 which monitor the environment around airplane 102. Illustratively, four sensor modules 131A-D are shown. Depending on the asset 102 being protected, fewer or additional sensor modules 131 may be used. In one embodiment, sensor modules 131 include focal plane array sensors with wide field of views that continuously survey the environment for mobile tracking devices 110. In one embodiment, warning/cuing system 130 looks for a characteristic signal that indicates the launch of an airborne mobile tracking device 110. In the case of airborne mobile tracking device 110, the mobile tracking device 110 has a characteristic infrared and ultraviolet signature which warning/cuing system 130 recognizes as an airborne mobile tracking device 110.

Exemplary warning/cuing systems include Model No. AAR-54 EWS available from Northrup Grumman Corporation located in Los Angeles, Calif. As explained herein, warning/cuing system 130 communicates with countermeasure device 100. Countermeasure device 100, in turn, provides optical energy from a continuous wave laser to redirect mobile tracking device 110 from tracking the path of asset 102 or to disable mobile tracking device 110. In one embodiment, warning/cuing system 130 is provided as part of countermeasure device 100 instead of as a separate component of airplane 102.

Airplane 102 further includes a fire control system 140. Fire control system 140 interprets information provided by warning/cuing system 130 and provides a user interface 142 through which the operator of asset 102 activates countermeasure device 100. In one embodiment, user interface 142 includes a user input 143 to enable countermeasure device 100 and a user input 145 to permit countermeasure device 100 to fire. In one embodiment, countermeasure device 100 is automatically activated when asset 102 is moving. Exemplary inputs include switches, buttons, and other suitable types of user inputs.

Returning to FIG. 1, countermeasure device 100 is represented. Countermeasure device 100 includes an optical transmitter system 150, a power system 152, a system controller 154, and a cooling system 156. Each of optical transmitter system 150, power system 152, and cooling system 156 are coupled to system controller 154. System controller 154 receives input from and provides instructions to each of optical transmitter system 150, power system 152, and cooling system 156 to control the operation of countermeasure device 100. As explained herein, in one embodiment, countermeasure device 100 is housed in a self-contained pod which may be coupled to asset 102.

Optical transmitter system 150 includes a laser source module 160 and a beam control module 162. Laser source module 160 includes a high voltage power supply 164 which receives power from power system 152. High voltage power supply 164 drives a continuous wave laser 166. In one embodiment, continuous wave laser 166 is a continuous wave fiber laser. In one embodiment, continuous wave laser 166 is a continuous wave Ytterbium single mode fiber laser. Details regarding an exemplary continuous wave laser 166 are provided in U.S. patent application Ser. No. 11/973,437, filed Oct. 9, 2007 and issued as U.S. Pat. No. 7,593,435 on Sep. 22, 2009, titled POWERFUL FIBER LASER SYSTEM, assigned to IPG Photonics Corporation, the disclosure of which is expressly incorporated by reference herein. Details regarding an exemplary continuous wave laser 166 are provided in U.S. patent application Ser. No. 11/611,247, filed Dec. 15, 2006 subsequently abandoned, titled FIBER LASER WITH LARGE MODE AREA FIBER, assigned to IPG Photonics Corporation, the disclosure of which is expressly incorporated by reference herein. In one embodiment, continuous wave laser 166 is a solid state laser. Other exemplary continuous wave lasers include a 2.0 micrometer ($\mu$m) Thulium Fiber Laser (1.96-2.2 ($\mu$m) Thulium laser) having an output power of about at least 1 kW and a 1.0 $\mu$m, 800 Watt Direct Diode. An exemplary Thulium fiber laser is disclosed in U.S. Pat. No. 6,801,550, the disclosure of which is expressly incorporated by reference herein.

Figure 4:
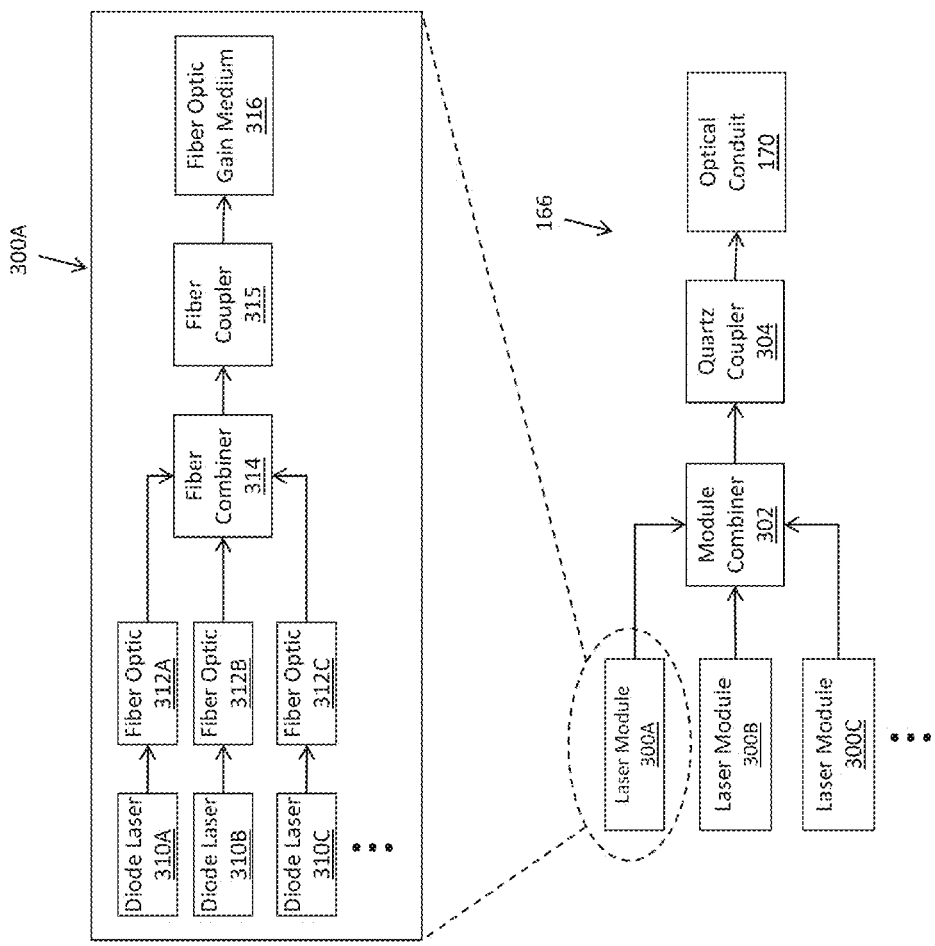
FIG. 4 illustrates an exemplary laser source.

Referring to FIG. 4, an exemplary configuration of continuous wave laser 166 is shown. Continuous wave laser 166 includes a plurality of individual modules 300 each of which provide a single mode 1.07 $\mu$m output beam. The output of each of modules 300 is combined together through a module combiner 302 which brings the energy together in a single beam. This combined beam is coupled to an optical conduit 170 through a quartz coupler 304. Although three laser modules 300 are illustrated, any number of laser modules 300 may be included.

The components of a given laser module 300 are also shown in FIG. 4. The laser module 300 includes a plurality of diode lasers 310 each of which are coupled into a respective Ytterbium fiber 312. The output of the Ytterbium fibers 312 are combined through a fiber combiner 314 which brings the energy together. This energy is fed through a coupler 315 into an Ytterbium fiber optic gain medium 316 which produces therefrom a single mode 1.07 $\mu$m output beam. Although three diode laser sets 310 are illustrated any number of diode laser sets 310 may be included.

In one embodiment, the power of continuous wave laser 166 is about 3 kilowatts (kW). In one embodiment, the power level of continuous wave laser 166 is about 5 kW. In one embodiment, the power level of continuous wave laser 166 is about 10 kW. In one embodiment, the power level of continuous wave laser 166 is about 20 kW. In one embodiment, the power level of continuous wave laser 166 is about 50 kW. In one embodiment, the power level of continuous wave laser 166 is between about 3 kW and 20 kW. In one embodiment, the power level of continuous wave laser 166 is at least 3 kW.

Returning to FIG. 1, the optical energy produced by continuous wave laser 166 is communicated to beam control module 162 through optical conduit 170. An exemplary optical conduit 170 is a fiber optic cable.

Beam control module 162 includes a beam expander 172 and a positioning system 174. Beam expander 172 receives the optical energy from optical conduit 170 and provides a generally collimated beam 176 of optical energy which exits countermeasure device 100. An exemplary beam expander is a Cassegrain telescope. Optical energy from optical conduit 170 is provided at a focus of the Cassegrain telescope which then generally collimates this optical energy to produce the expanded beam of optical energy 176. In one embodiment, a path length of beam expander 172 may be automatically adjusted by system controller 154 to change output beam 176 from a generally collimated beam of optical energy to a focused beam of optical energy. In this case, beam expander 172 may serve both as a beam expander (collimator) and focusing optics. In one embodiment, beam control module 162 also includes separate focusing optics 177 which focus the output beam 176 at a given distance from countermeasure device 100.

Figure 5:
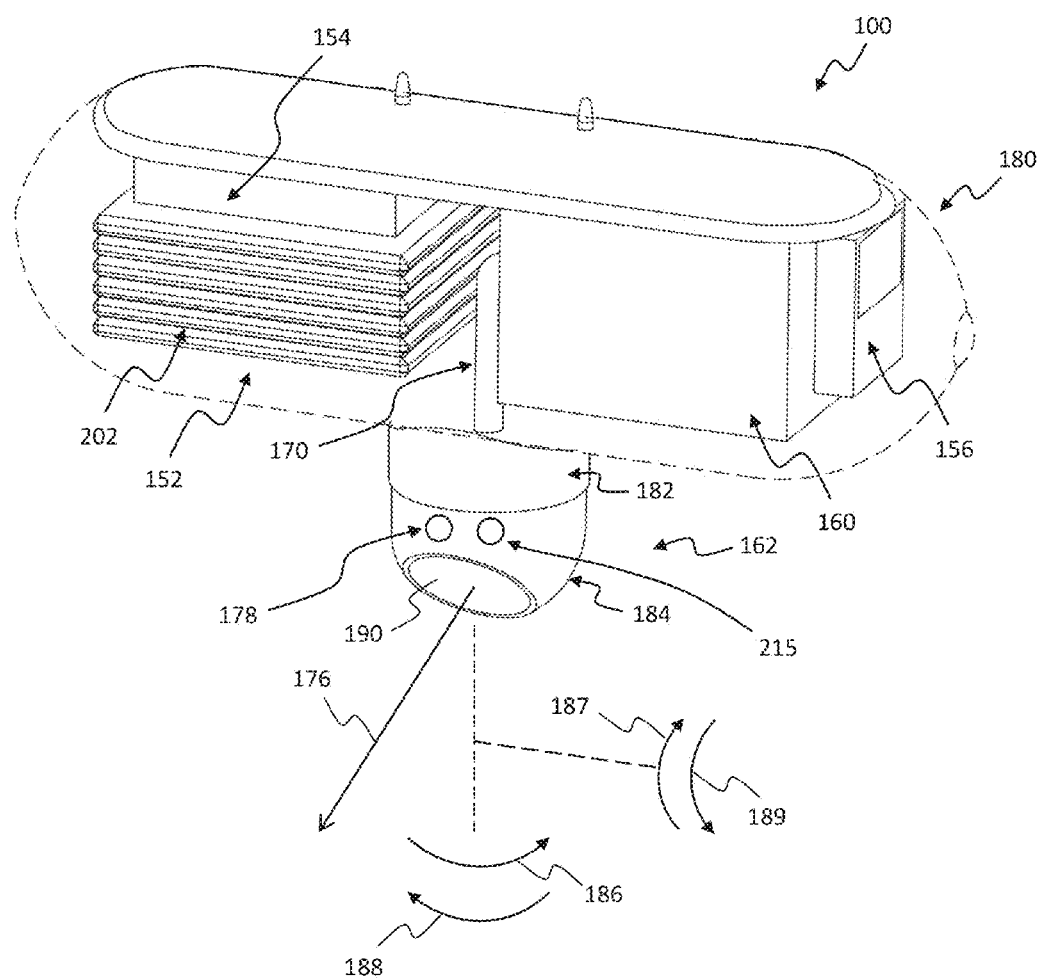
FIG. 5 illustrates a perspective view of a countermeasure device wherein portions of the housing are shown in phantom.

Positioning system 174 alters the direction in which collimated beam 176 is directed. Referring to FIG. 5, an exemplary configuration of countermeasure device 100 is shown. Countermeasure device 100 includes a housing 180 which houses system controller 154, power system 152, cooling system 156 and laser source module 160 of optical transmitter system 150. Provided on a lower side of housing 180 is positioning system 174. Positioning systems 174 includes a housing 182 coupled to housing 180 and a rotatable head 184 which is rotatable in directions 186 and 188. In one embodiment, the rotatable head 184 has a pointing accuracy of up to 25 micro-radians. Rotatable head 184 includes an optical window 190 through which output beam 176 is directed. Output beam 176 is generally a directed beam and is not radiated in all directions. In one embodiment, positioning system 174 also includes at least one reflector 179 which may be controlled to alter the direction output beam 176 in directions 187 and 189. The reflector 179 may be tilted to alter the elevation of collimated beam 176 by positioning system 174.

Figure 2:
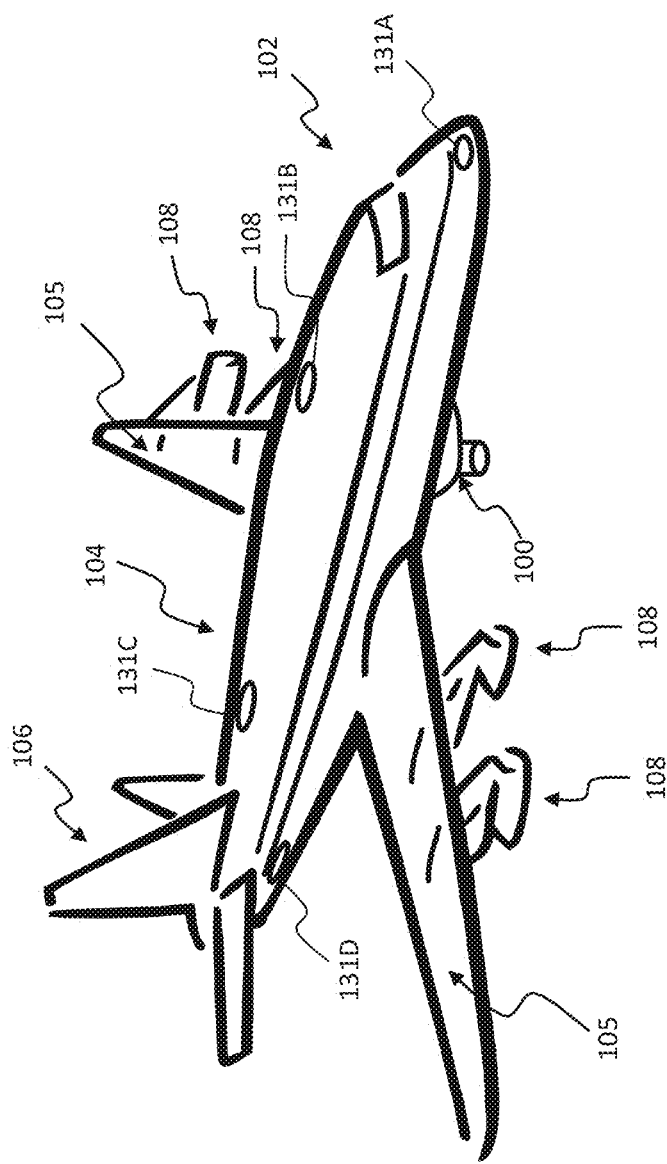
FIG. 2 is a view of a representative asset.

Housing 180, in the illustrated embodiment, is a pod which is detectably coupled to airplane 102 (see FIG. 2). Referring to FIG. 5, housing 180 includes a set of couplers 181 which cooperate with couplers 183 on asset to couple housing 180 to airplane 102. In one embodiment, housing 180 is coupled to airplane 102 by any suitable conventional mechanism which permits housing 180 to be later detached from airplane 102. An exemplary system is the coupling system used with the AN/AAQ-28(V) LITENING targeting pod commercially available from Northrop Grumman Corporation located in Los Angeles, Calif.

Returning to FIG. 1, power system 152 includes a power source 200. In one embodiment, power source 200 is a plurality of batteries. The batteries may be rechargable batteries. Exemplary rechargeable batteries include lithium-ion batteries and lithium polymer batteries. Exemplary lithium-ion batteries include commercially available cells, such as those available from A123 Systems located in Watertown, Mass. In one embodiment, a plurality of lithium-ion cells are assembled into a battery pack 202 (see FIG. 5). In one embodiment, these cells have a nominal amp-hour rating of 2.3 Ah and a nominal load voltage of 3.3 DCV/cell. Based thereon, battery pack 202 should be able to deliver 52.8 V at 2.3 amps for 1 hour. Under high load (10 C (10×5×2.3 or 115 Amps)) the voltage will "squat" to approximately 2.8 volts/cell. At this level the battery pack 202 could deliver 45 V at 115 amps (or 5 kW) for 6 min. Under severe load (20C (20×5*2.3) or 230 amps)) the voltage would squat to approximately 2.5 volts. At this level the battery pack 202 could deliver 40 V at 230 amps (or 9 kW) for about a half minute. In one embodiment, battery pack 202 provides 28 VDC power for countermeasure device 100.

The use of battery pack 202 allows high power to be provided to laser source module 160 without causing a large power spike requirement in the power system of asset 102. In essence, battery pack 202 acts as a capacitor for laser source module 160.

In one embodiment, continuous wave laser 166 is a three kilowatt Yterrbium single mode fiber laser such as ones commercially available from IPG Photonics located at IPG Photonics Corporation, 50 Old Webster Road Oxford, Mass. 01540 USA and power supply 152 provides about 28 VDC. In general, commercial laser sources from IPG Photonics include an AC-to-DC converter to convert power from an AC source to DC power for continuous wave laser 166. Since power supply 152 already provides DC power, when a commercial laser source is being used for continuous wave laser 166 the AC-to-DC converter is removed and replaced with a DC driving circuit 320 (see FIGS. 6 and 7) which corresponds high voltage power supply 164. DC driving circuit 320 provides power from power supply 152 to continuous wave laser 166 and regulates the power level provided.

Figure 6:
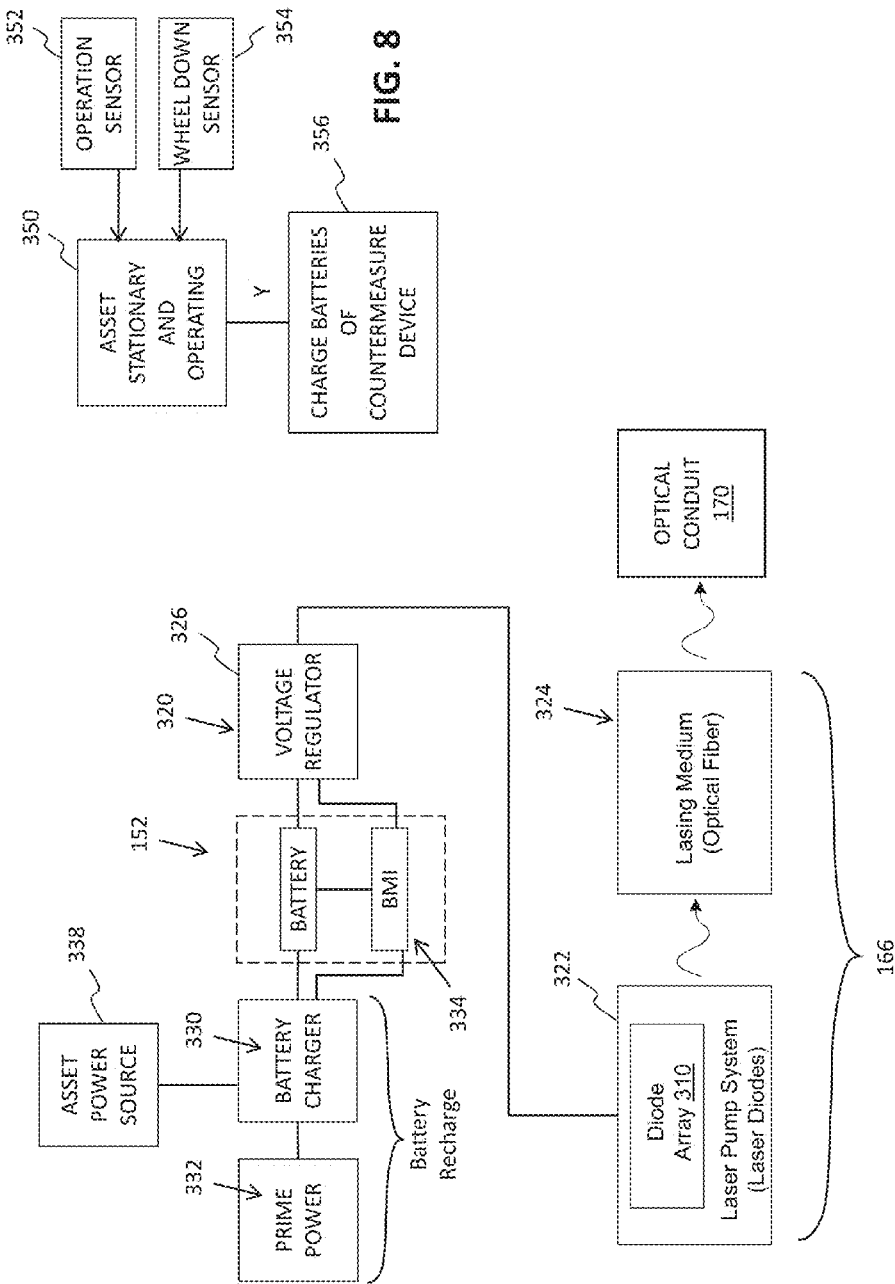
FIG. 6 illustrates a first arrangement of components of the portable cutting device.
Figure 7:
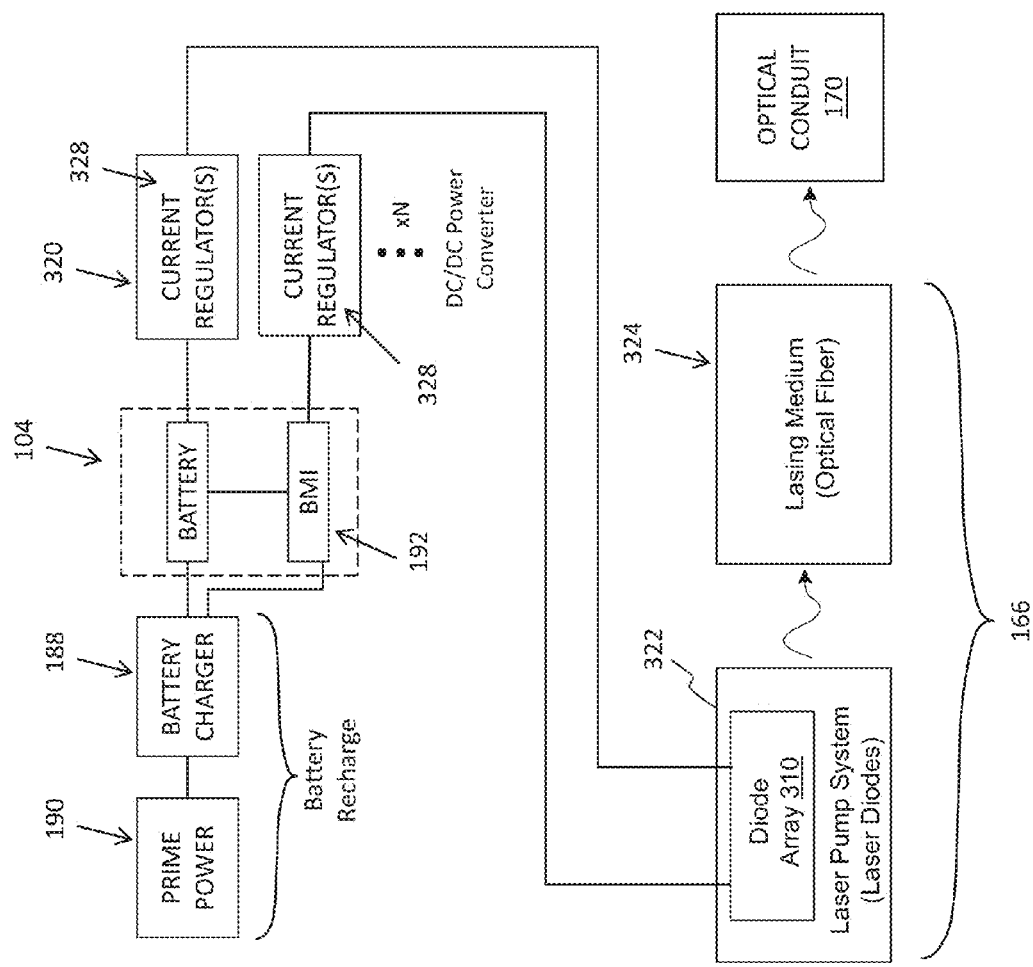
FIG. 7 illustrates a second arrangement of components of the portable cutting device.

Referring to either FIG. 6 or FIG. 7, continuous wave laser 166 is represented. Continuous wave laser 166, as explained in connection with FIG. 4, includes a laser pump system 322 which includes a plurality of laser diodes 310. Laser diodes 310 provide the pump energy for the lasing medium 316 of continuous wave laser 166. The lasing medium 316 is provided as part of a fiber optical cable. The output of the lasing medium 316 is provided to optical conduit 170.

In FIG. 6, power supply 152 is coupled to laser diodes 183 through DC driving circuit 320 which includes a single voltage regulator 326 that powers laser diodes 310. In FIG. 7, power supply 152 is coupled to laser diodes 310 through DC driving circuit 320 which includes a plurality of current regulators 328. Each current regulator 328 provides the power to one of the modules 300 (see FIG. 4) to provide power to the diodes of that module 300.

Referring to either FIG. 6 or FIG. 7, power supply 152 may be charged with a battery charger 330 coupled to a prime power source 332. Battery charger 330 is contained within housing 180. Exemplary prime power sources include a standard AC wall outlet. Power supply 152 includes a battery management interface 334 which controls the recharging of the batteries with battery charger 330.

In one embodiment, power system 152 is recharged by a power source 338 of the asset 102. An exemplary power source 338 is a DC generator of asset 102. Referring to FIG. 8, a controller of asset 102 determines if asset 102 is operating and stationary (or otherwise operating at a low power level), as represented by block 350. The controller checks an operational sensor 352 to determine if asset 102 is operational. Exemplary operational sensors include engine sensors which indicate the operation of propulsion devices 108. The controller also checks in the case of an airplane 102, a wheel down sensor 354, which indicates when the landing gear of airplane 102 is lowered. If the controller determines that airplane 102 is stationary (wheels down) and operational, then the controller provides charging energy to battery charger 330, as represented by block 356. In one embodiment, airplane 102 does not need to be stationary, but rather only be operating at a low power level, such as flying at a moderate speed. In this case, the controller monitors a power load of airplane 102 and provides charging energy to battery charger 330 when the power load is below a threshold amount.

Cooling system 156 provides cooling to the other components of countermeasure device 100. In one embodiment, cooling system 156 provides cooling to laser source module 160. In one embodiment, cooling system 156 provides cooling to laser source module 160 and the optical components of beam control module 162. In one embodiment, cooling system 156 provides cooling fluid to power system 152, laser source module 160, and the optical components of beam control module 162. Cooling system 156 may be either air-cooled or liquid cooled. Exemplary cooling systems are provided from Thermo Tek, Inc. located at 1200 Lakeside Parkway, Suite 200 in Flower Mound, Tex.

As indicated in FIG. 1, the components of countermeasure device 100 are coupled to each other and to asset 102 through a digital communication system. In one embodiment, the digital communication system includes a common bus for the components within countermeasure device 100. Although a digital communication system is illustrated, any suitable connection is acceptable between the components, such as analog connections. In one embodiment, laser source module 160 is coupled to enable input 143 and fire input 145 through discrete connections outside of the digital communication system. Further, warning/cuing system 130 is coupled to system controller 154 through a separate communication connection. An exemplary communication connection is the MIL-STD-1553 Bus.

Figure 9:
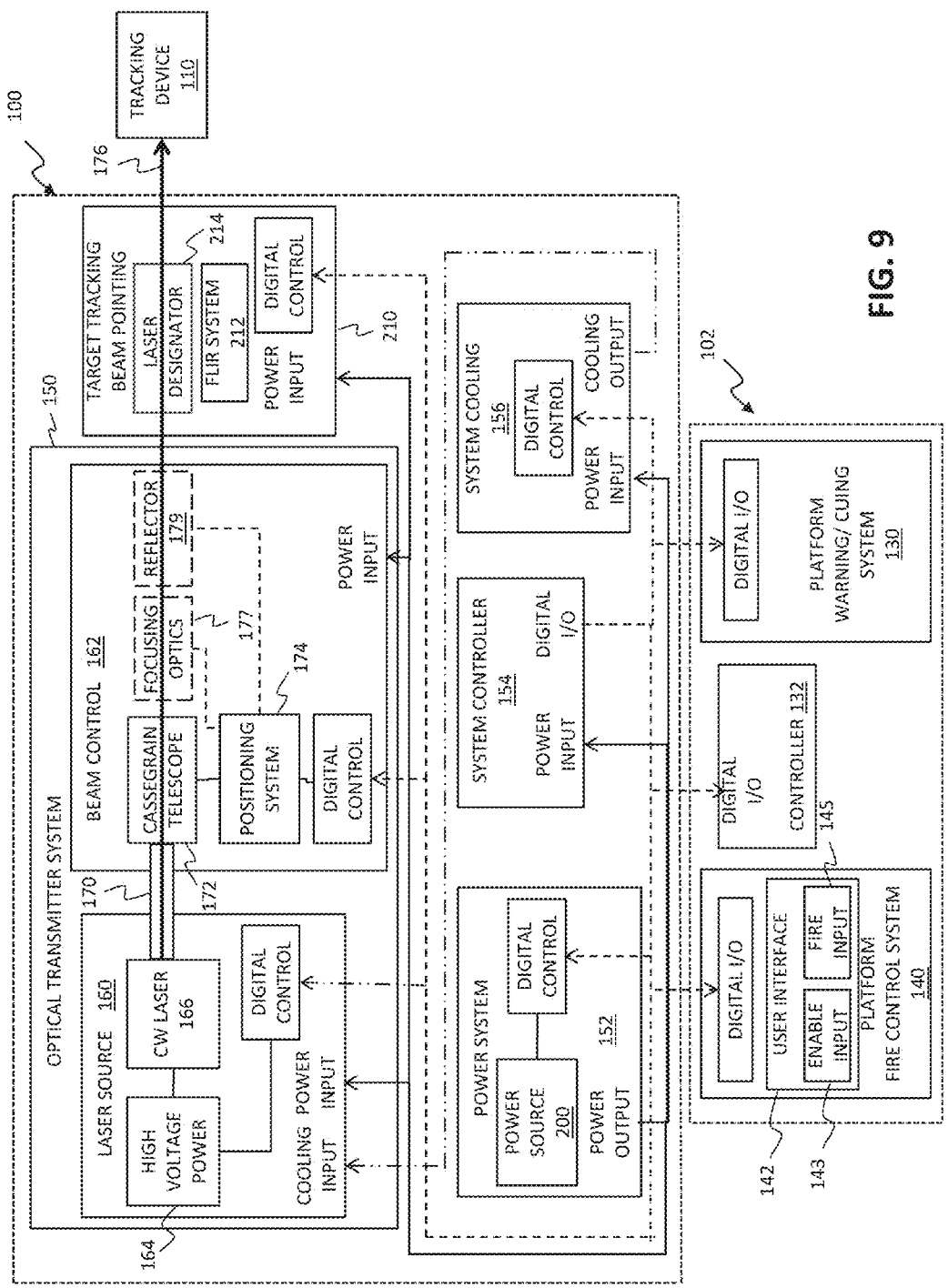
FIG. 9 illustrates a representative view of a countermeasure device and associated asset.

Referring to FIG. 9, in one embodiment, countermeasure device 100 also includes a target tracking and beam pointing system 210. Target tracking and beam pointing system 210 monitors the scene surrounding asset 102. In one embodiment, beam pointing system 210 includes a vision system, illustratively a FLIR system 212, which provides images of the scene surrounding asset 102. FLIR system 212, illustratively, has a separate optical window 178 through which the vision system monitors the location of mobile tracking device 110. In one embodiment, FLIR system 212 uses the same optical window 190 as output beam 176 and is bore sighted to output beam 176.

Figure 10A:
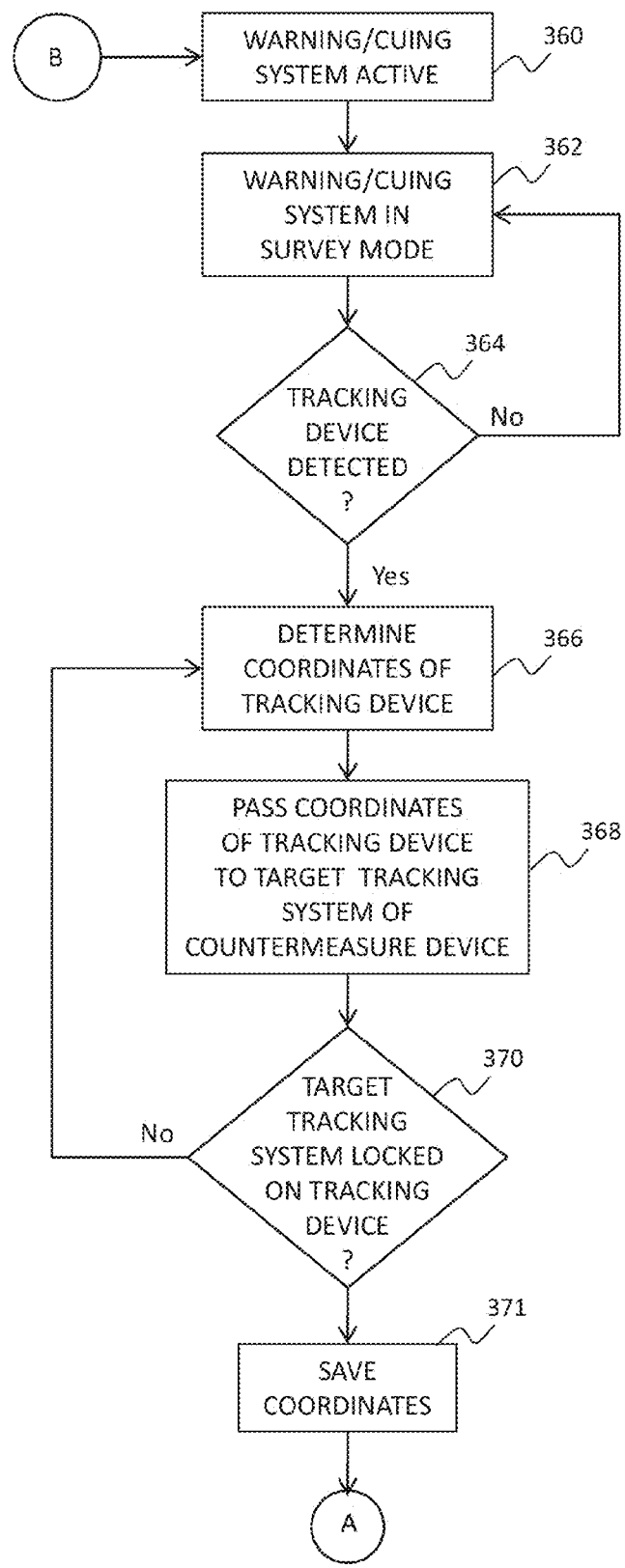
FIGS. 10A and 10B illustrate a processing sequence for engaging a mobile tracking device.
Figure 10B:
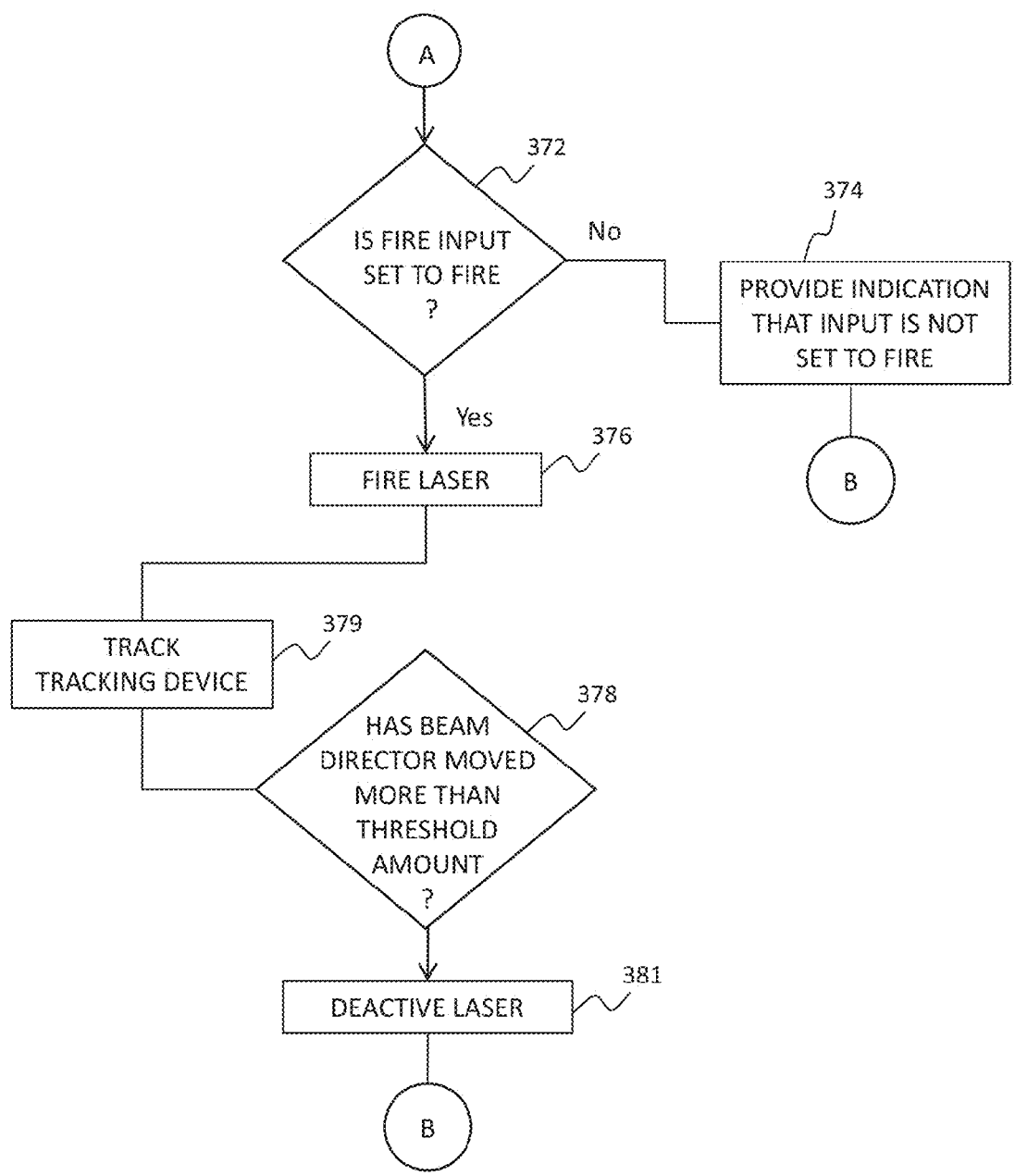

Referring to FIGS. 10A and 10B, an operation of countermeasure device 100 is illustrated. Referring to FIG. 10A, a check is made by a controller 132 of asset 102 whether warning/cuing system 130 is active, as represented by block 360. Further, warning/cuing system 130 is set to survey mode, as represented by block 362. In survey mode, warning/cuing system 130 monitors the environment around asset 102 to determine if a mobile tracking device 110 is approaching asset 102, as represented by block 364. If a mobile tracking device 110 is detected by warning/cuing system 130, then the controller 132 of asset 102 determines the coordinates of mobile tracking device 110, as represented by block 366. Warning/cuing system 130 may also sound an alarm or provide another indication of mobile tracking device 110 to the operator of asset 102. Exemplary coordinates for the case when the asset is airplane 102 are the azimuth and elevation angles of mobile tracking device 110 relative to airplane 102.

The controller 132 of asset 102 passes the coordinates of mobile tracking device 110 to countermeasure device 100, as represented by block 368. Countermeasure device 100 moves rotatable head 184 to the specified angular position and FLIR system 212 is directed at the specified coordinates. FLIR system 212 may be gimbaled to move independently within housing 180. The controller 132 of asset 102 determines if mobile tracking device 110 has acquired mobile tracking device 110 with tracking module 210, as represented by block 370. If countermeasure device 100 has not acquired mobile tracking device 110, new coordinates of mobile tracking device 110 are determined and passed again to countermeasure device 100. As such, countermeasure device 100 remains slaved to controller 132. If countermeasure device 100 has acquired mobile tracking device 110 then the initial coordinates corresponding to the lock on location of mobile tracking device 110 are saved by system controller 154, as represented by block 371.

Next, system controller 154 of countermeasure device 100 checks to see if countermeasure device 100 is authorized to fire continuous wave laser 166, as represented by block 372. Continuous wave laser 166 is authorized to fire when fire input 145 is set to fire. If continuous wave laser 166 is not authorized to fire, then an indication of this is provided to the operator of countermeasure device 100, as represented by block 374. Exemplary indications include visual alarms, audio alarms, tactile alarms, and combinations thereof. If continuous wave laser 166 is authorized to fire, then continuous wave laser 166 is fired at mobile tracking device 110. Beam control module 162 has already adjusted the output direction of collimated beam 176 to coincide with the direction to countermeasure device 100.

After countermeasure device 100 has acquired mobile tracking device 110, beam pointing system 210 tracks the location of mobile tracking device 110 and updates the coordinates for mobile tracking device 110, as represented by block 379. Beam control module 162 rotates and reflector 179 tilts, as necessary, to maintain collimated beam 176 on mobile tracking device 110.

The position of beam control module 162 is monitored to determine when it has moved a threshold amount, as represented by block 378. Once mobile tracking device 110 has changed direction by a threshold amount, it no longer is locked on asset 102 and the threat to asset 102 is neutralized. This change in direction of mobile tracking device 110 is indicated by the change in direction of beam control module 162 to keep collimated beam 176 on mobile tracking device 110. Once the threshold amount is reached, continuous wave laser 166 is deactivated as represented by block 381. Control is again passed back to warning/cuing system 130 to monitor for additional mobile tracking devices 110.

In one embodiment, the threshold amount is about 10 degrees in either the azimuth or elevation directions. In one embodiment, the threshold amount is about 5 degrees in either the azimuth or elevation directions. In one embodiment, the threshold amount is about 3 degrees in either the azimuth or elevation directions. In one embodiment, system controller 154 monitors the time since mobile tracking device 110 was acquired by countermeasure device 100 and deactivates continuous wave laser 166 once a threshold amount of time has passed.

In one embodiment, beam pointing system 210 has a narrower field of view than sensor modules 131 of warning/cuing system 130. As such, sensor modules 131 are able to survey the surrounding environment for mobile tracking device 110 approaching from various directions, while beam pointing system 210 is fixed on the narrow portion of the environment surrounding a detected mobile tracking device 110.

In one embodiment, warning/cuing system 130 is integrated into countermeasure device 100 and system controller 154 detects the launch of a mobile tracking device 110 based on the images captured by warning/cuing system 130. Although various tasks are discussed as being carried out by one of warning/cuing system 130, controller 132, and system controller 154, these may be carried out by a common controller.

As mentioned herein output beam 176 is produced by a continuous wave laser 166. Output beam 176 is able to defeat mobile tracking devices 110 which modulate the incoming electromagnetic radiation even though output beam 176 is not pulsed and contains no jamming code. Output beam 176 is also effective against imaging detection systems of more advanced mobile tracking device 110.

Figure 11:
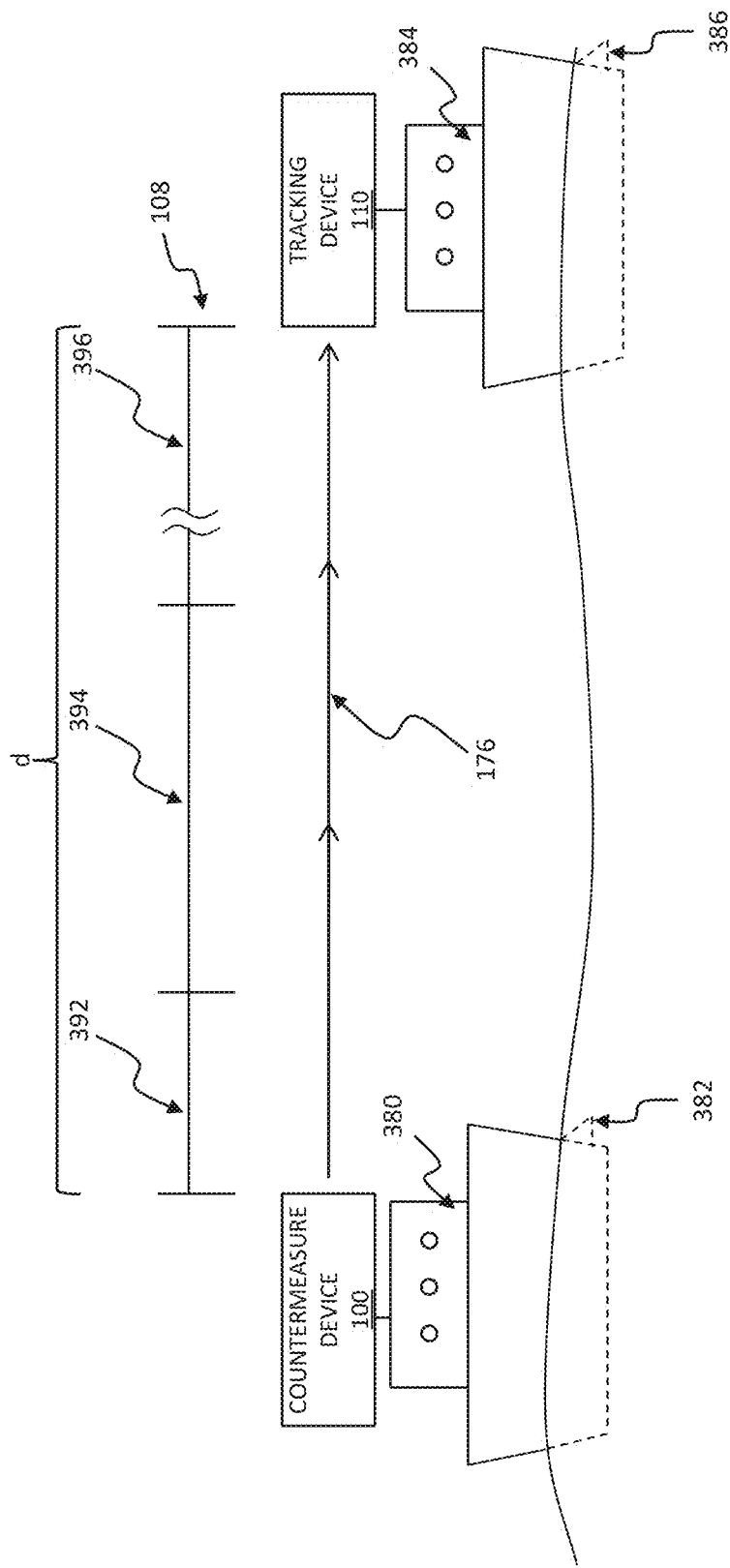
FIG. 11 illustrates a representative asset being tracked by a representative mobile tracking device.

Referring to FIG. 11, a ship 380 is shown having a rudder 382 and countermeasure device 100. Also shown is a second ship 384 having a rudder 386 which directs the direction of travel of second ship 384. Second ship 384 also incorporates a mobile tracking device 110. Second ship 384 is attempting to track first ship 380 and close the distance between first ship 380 and second ship 384. Mobile tracking device 110 generates course correction signals for second ship 384 so that second ship 384 continues to close on first ship 380. In this example, mobile tracking device 110 does not include a separate propulsion system 112 and guidance system 114. Rather, second ship 384 has its own propulsion system, such as an engine, and rudder 386 directs the travel path of second ship 384 based on input from controller 116.

As illustrated in FIG. 3, telescope 120 of mobile tracking device 110 attempts to collect a large amount of electromagnet radiation to extend the viewing range of the countermeasure device 100. The distance d indicated in FIG. 11, corresponds to a viewing distance of mobile tracking device 110 which is the distance at which mobile tracking device 110 is first able to detect first ship 380. At distances beyond distance d, mobile tracking device 110 is not able to see first ship 380. Of course, mobile tracking device 110 may be closer to first ship 380 than the distance d and in fact over time mobile tracking device 110 tracks first ship 380 so that second ship 384 closes the distance between second ship 384 and first ship 380.

Countermeasure device 100, upon locking on the position of mobile tracking device 110, fires continuous wave laser 166 such that output beam 176 is received by telescope 120 of mobile tracking device 110. Output beam 176 has different effects on mobile tracking device 110 depending on the separation of mobile tracking device 110 from countermeasure device 100. Distance d is illustratively divided into three bands, a near distance band 392, a mid distance band 394, and a far distance band 396. At distances in near distance band 392, the energy of output beam 176 explodes seeker head 115 and destroys mobile tracking device 110. At distances in mid distance band 394, the energy of output beam 176 destroys the functionality of detector 118. In one example, a countermeasure device 100 including a 3 kW Yterrbium continuous fiber laser as continuous wave laser 166 destroyed a focal plane array detector of a mobile tracking device 110 at a distance of about 3 kilometers.

At distances in far distance band 396, the energy of output beam 176 produces a plurality of internal localized sources within mobile tracking device 110. These internal localized sources are produced by the energy of output beam 176 being absorbed by the optical components of mobile tracking device 110 which then reradiate the absorbed energy in multiple wavelengths, similar to a blackbody source. Referring to FIG. 3, six internal localized sources 400 are illustrated. Sources 400A and 400B correspond to filter 125. Source 400C corresponds to optical window 128. Source 400D corresponds to secondary mirror 123. Source 400E corresponds to primary mirror 121. Source 400F corresponds to optics 124. The sources 400 may be produced based on the absorption characteristics of the material of each component or the presence of an imperfection in a component. For instance, optical window 128 may become scratched during travel resulting in an imperfection that produces source 400C. Although six sources 400 are illustrated, a single source 400 or other number of sources 400 may be produced at various times.

The source 400 produces infrared energy which is brighter than the infrared signature of asset 102 being tracked by mobile tracking device 110. As such, controller 116 of mobile tracking device 110 interprets the respective source 400 as asset 102 instead of asset 102 itself. If source 400 is off-axis, this will cause controller 116 to try to center source 400 resulting in error signal 129 being increased. Guidance system 114 will then turn mobile tracking device 110 in an attempt to center source 400. This results in mobile tracking device 110 turning away from the location of asset 102. Since source 400 is radiating from a portion of mobile tracking device 110, it cannot be centered. In one embodiment, the power level of continuous wave laser 166 is about 3 kW exiting countermeasure device 100.

Source 400 do not explode mobile tracking device 110, such as what happens in near distance band 392, nor is detector 118 of mobile tracking device 110 destroyed, such as what happens in mid distance band 394. Rather, source 400 confuses controller 116 to believe that one or more (if multiple sources) additional objects are present in the field of view of mobile tracking device 110 with a higher intensity than asset 102. Controller 116 tracks the brightest object in its field of view and thus attempts to track one of sources 400, instead of asset 102.

In far distance band 396, mobile tracking device 110 is not destroyed, but rather sent off course. As mobile tracking device 110 approaches countermeasure device 100 the power level of output beam 176 increases exponentially resulting in detector 118 being destroyed in mid distance band 394 and/or mobile tracking device 110 exploding in near distance band 392. Of course, if mobile tracking device 110 is engaged in far distance band 396 mobile tracking device 110 likely will not enter mid distance band 394 because mobile tracking device 110 will be directed in a different direction due to output beam 176.

In one embodiment, a wavelength of the continuous wave laser 166 and a power of the continuous wave laser are selected to cause at least one of an interference effect and a destructive effect to one of the sensor of the mobile tracking device and a guidance system of the mobile tracking device. In one embodiment, the interference effect is a heat energy absorption of the continuous wave laser and a re-radiation of energy within the guidance system of the mobile tracking device. In one embodiment, the interference effect include at least one of heating and electromagnetic interference which create an undesired interference with the sensor or guidance system of the mobile tracking device. In one embodiment, the destructive effect includes at least one of melting, ablating, fracturing, signal destruction, data transfer destruction, erasure of data, modification of data; unprogrammed signal inputs/outputs from integrated circuits in one of the sensor of the mobile tracking device and a guidance system of the mobile tracking device.

Figure 12:
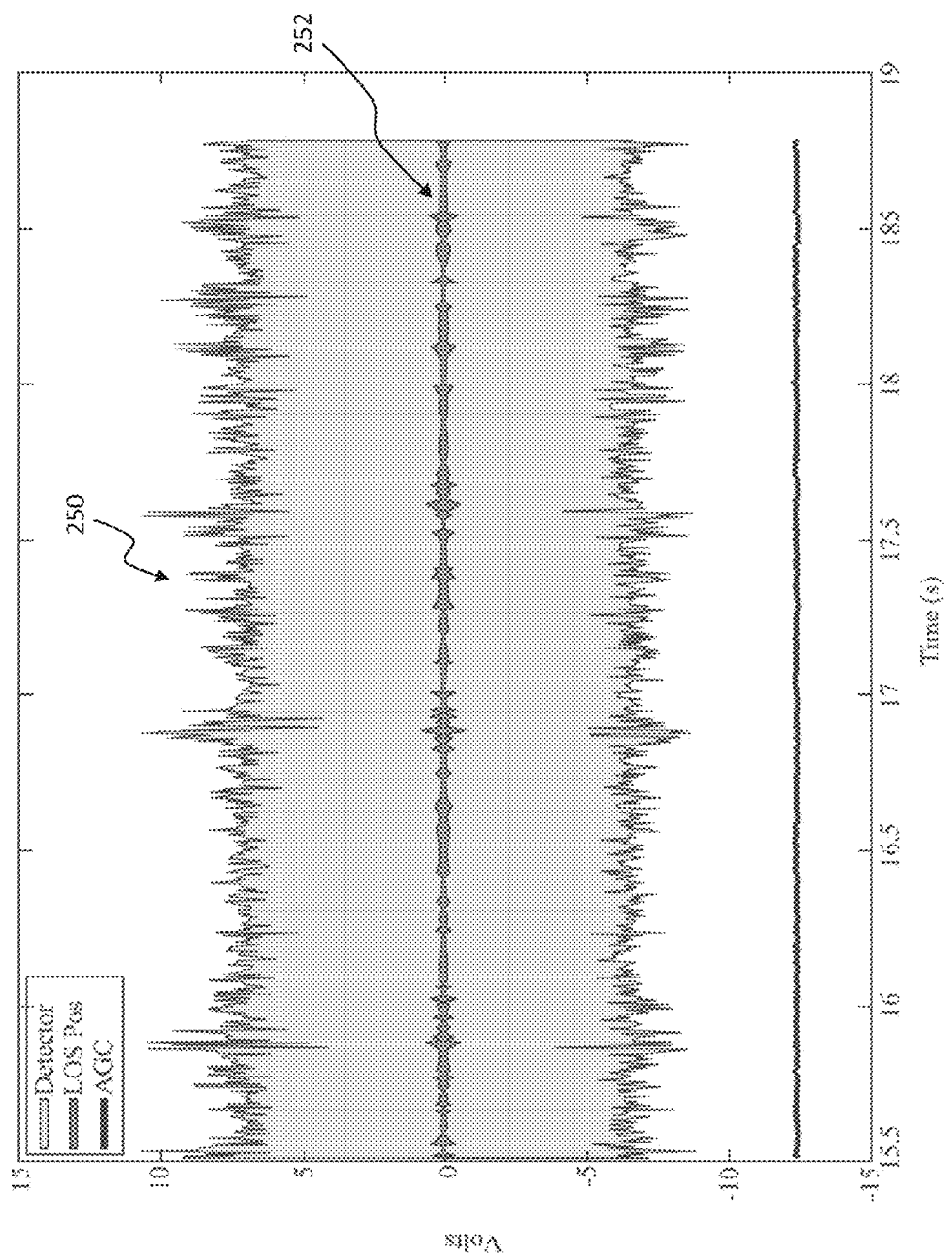
FIGS. 12 and 13 represent the response characteristics of a mobile tracking device following an asset.
Figure 13:
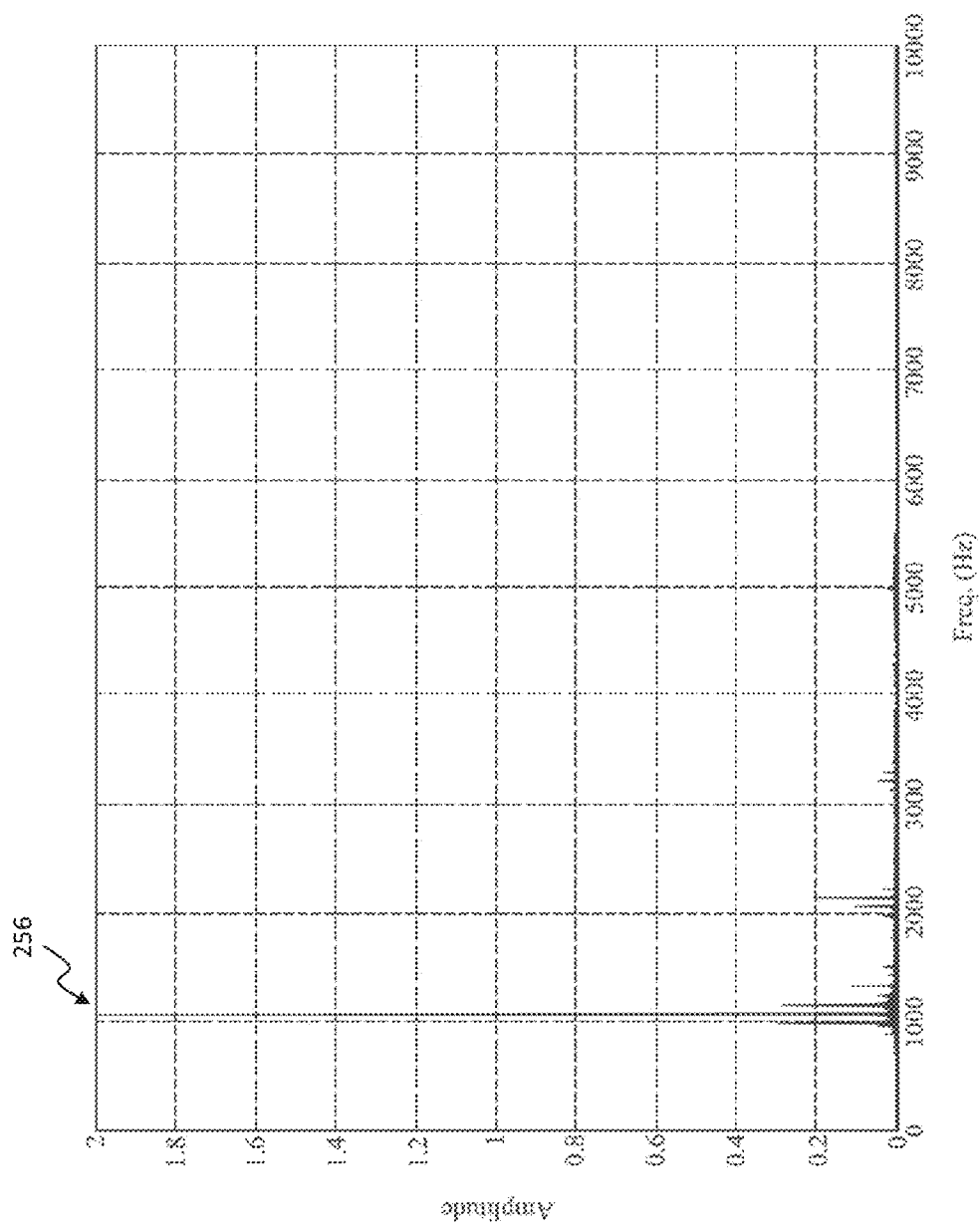
Figure 14:
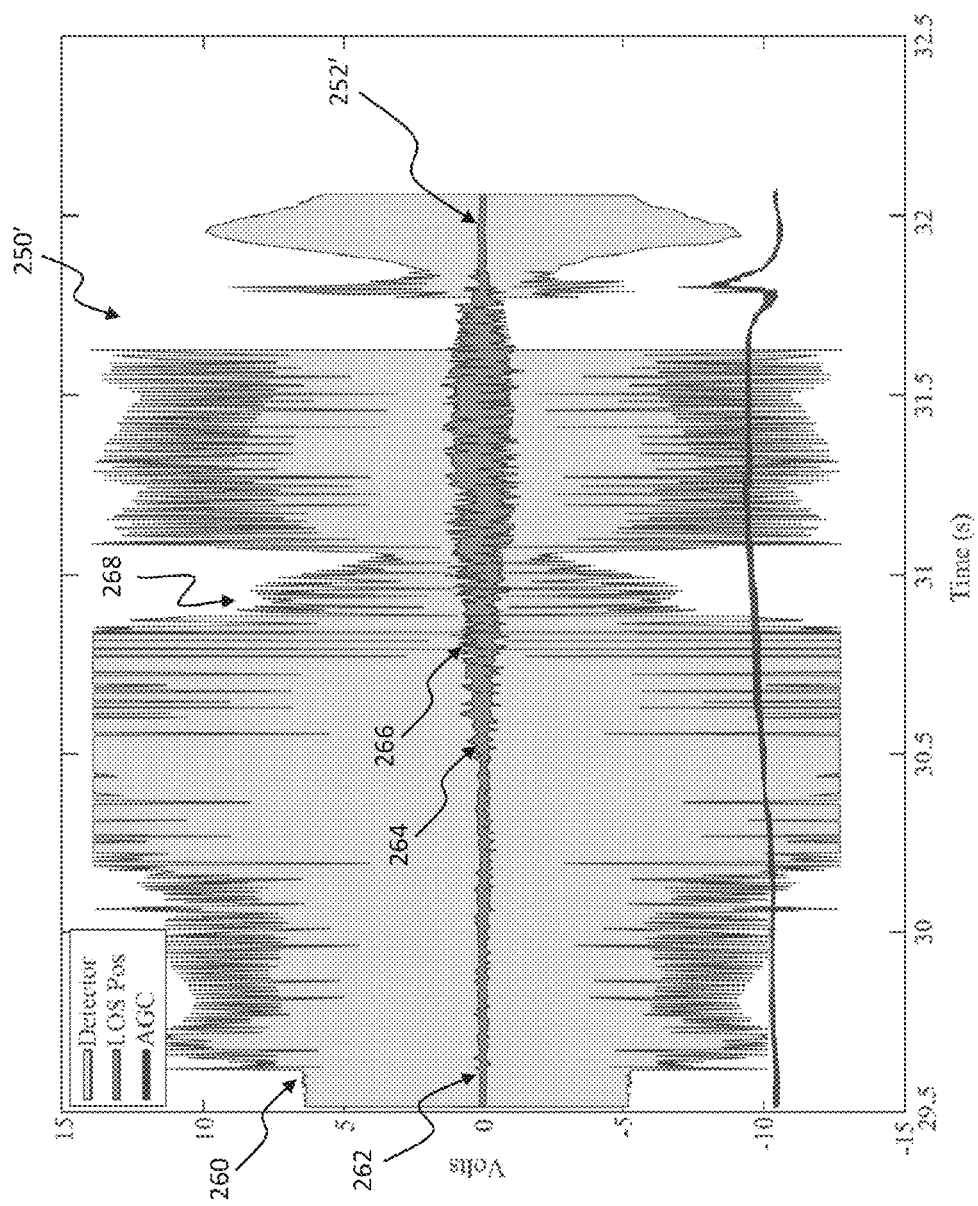
FIGS. 14 and 15 represent the response characteristics of a mobile tracking device following an asset and being subsequently illuminated by a countermeasure device.
Figure 15:
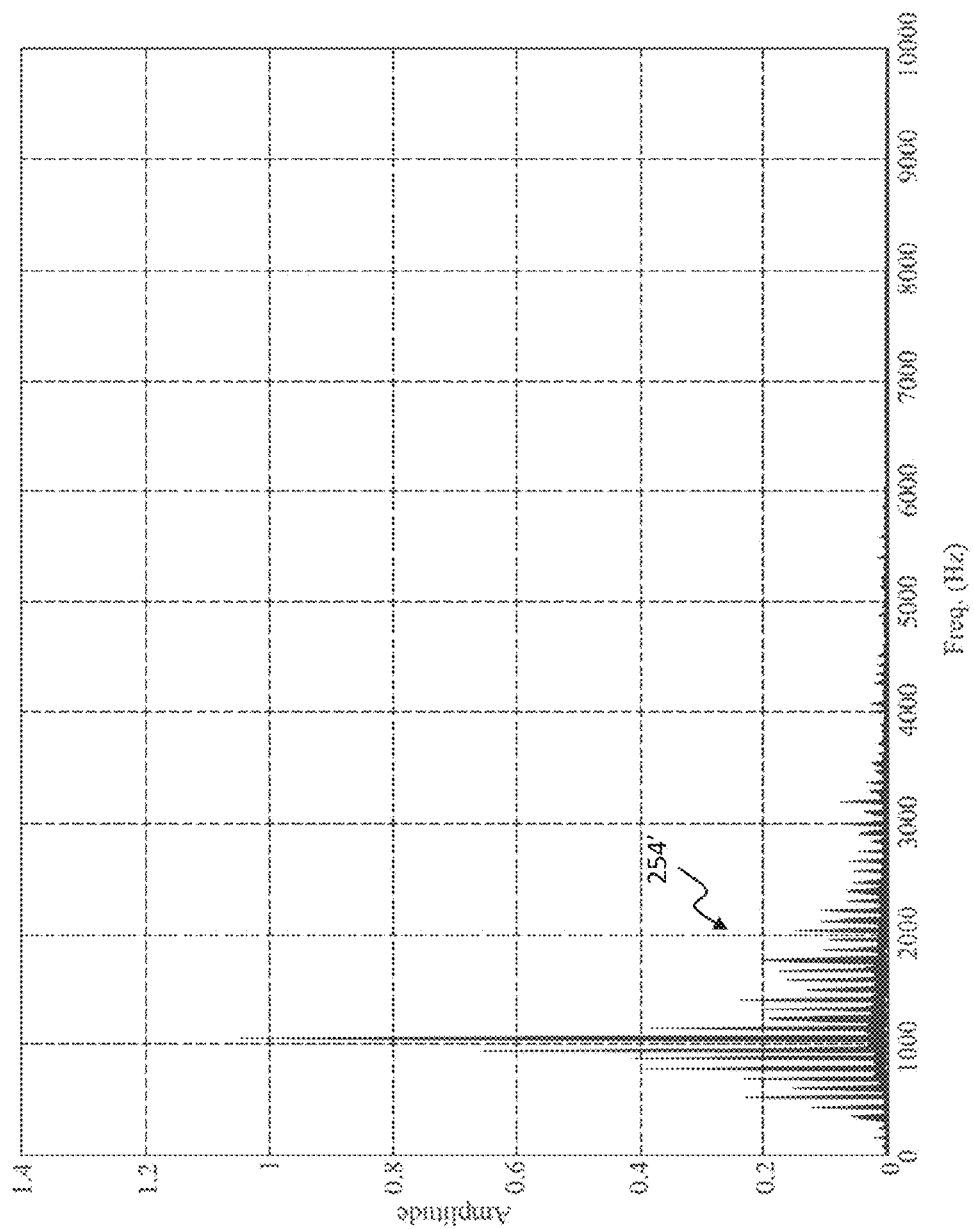

The effects of sources 400 are shown through a comparison of FIGS. 14 and 15 with FIGS. 12 and 13. Referring to FIG. 12, a typical response of a mobile tracking device 110 in far distance band 396 is shown. The degree of turn being carried out by a mobile tracking device 110 is proportional to a voltage associated with a gyroscope of the seeker head 115. In FIG. 12, a raw voltage of detector 118 is shown as curve 250. Also shown is the voltage associated with the gyroscope of the seeker head 115 as curve 252. The amplitude of curve 252 corresponds to error signal 129. The curve 252 shown in FIG. 12, represents a mobile tracking device 110 which has locked onto an asset 102 and is following directly behind the asset 102. The Fourier transform of curve 250 is shown in FIG. 13. As shown in FIG. 13, the spectrum 254 for curve 250 is generally tightly defined around 1000 Hz. This is generally consistent with the modulation scheme of the mobile tracking device 110 when it is inline with asset 102.

Referring to FIG. 14, a 3 kilowatt, continuous wave, infrared, Ytterbium single mode fiber laser with an $m^2$ of 1 was used as continuous wave laser 166 of countermeasure device 100 associated with an asset 102. In tests, a mobile tracking device 110 was fired at asset 102. Countermeasure device 100 directed a continuous beam of optical energy 176 at the optical window 128 of mobile tracking device 110. The continuous beam of optical energy causes the generation of sources 400 which are falsely recognized by mobile tracking device 110 as asset 102.

Referring to FIG. 14, the corresponding curves 250' and 252' for the above example are shown. A first portion 260 of curve 250' (and corresponding portion 262 of curve 252') are shown prior to activation of continuous wave laser 166. As shown by portion 262, the travel of mobile tracking device 110 is fairly straight. Continuous wave laser 166 is activated at point 264. This results in detector 118 being flooded with IR energy as represented by the increase in amplitude of curve 250' and the generation of sources 400. The generation of sources 400 appears to be later in time potentially indicating the need for the components of mobile tracking device 110 to heat up to cause sources 400. At portion 264 of curve 252' controller 116 is instructing guidance system 114 to turn mobile tracking device 110 more aggressively. This increase in turning of mobile tracking device 110 increases in portion 266 even as the intensity of curve 250' falls in portion 268. This fall in intensity is indicative of mobile tracking device 110 moving far off course so that not as much of collimated beam 176 enters optical window 128. As shown in FIG. 15, the spectrum 254' for curve 250' is considerably broadened compared to spectrum 254 of FIG. 12.

Figure 2A:
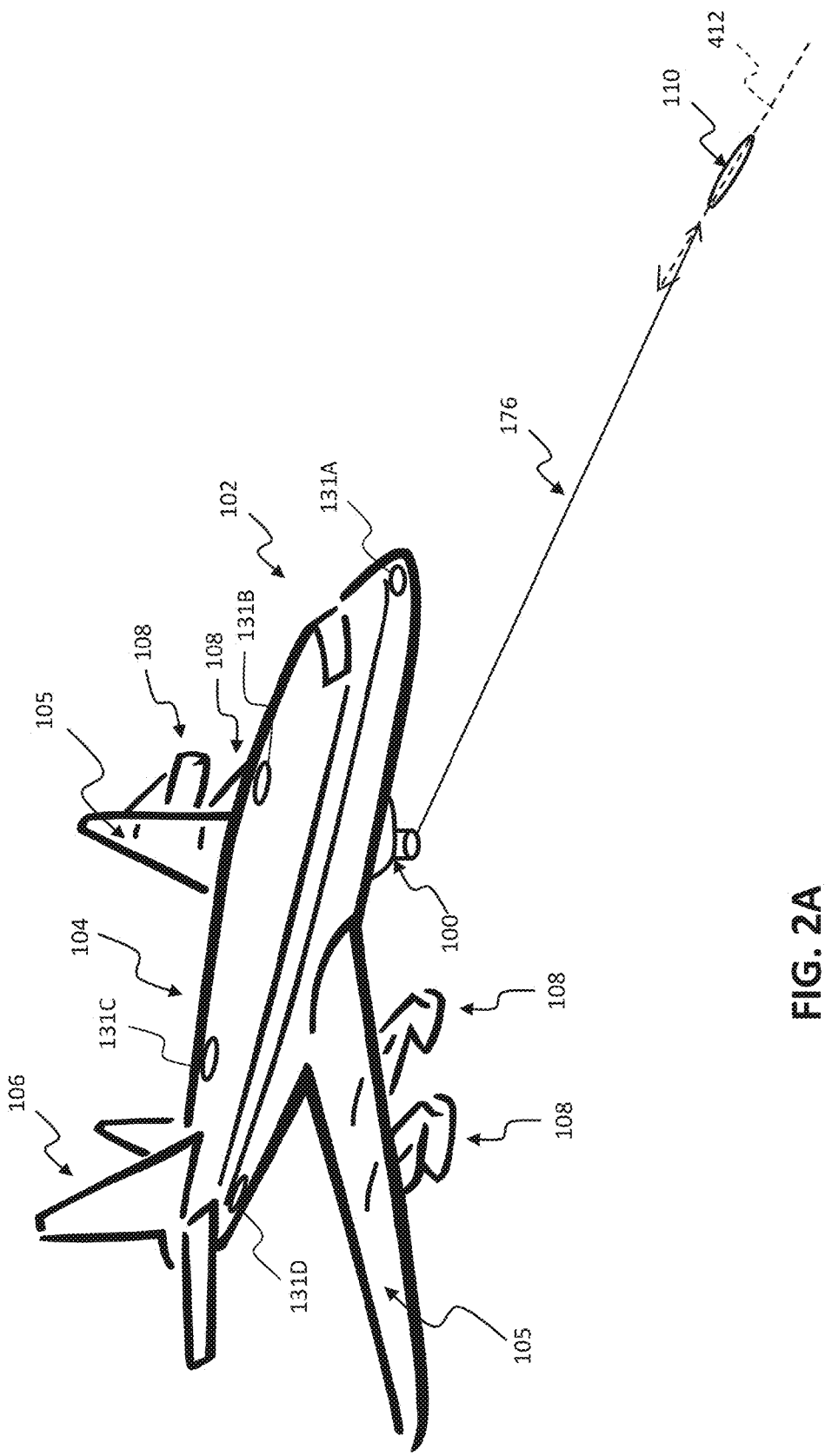
FIG. 2A illustrates the representative asset of FIG. 2 with a mobile tracking device approaching the representative asset along a first direction and optical energy from the countermeasure device being directed at the mobile tracking device.
Figure 2B:
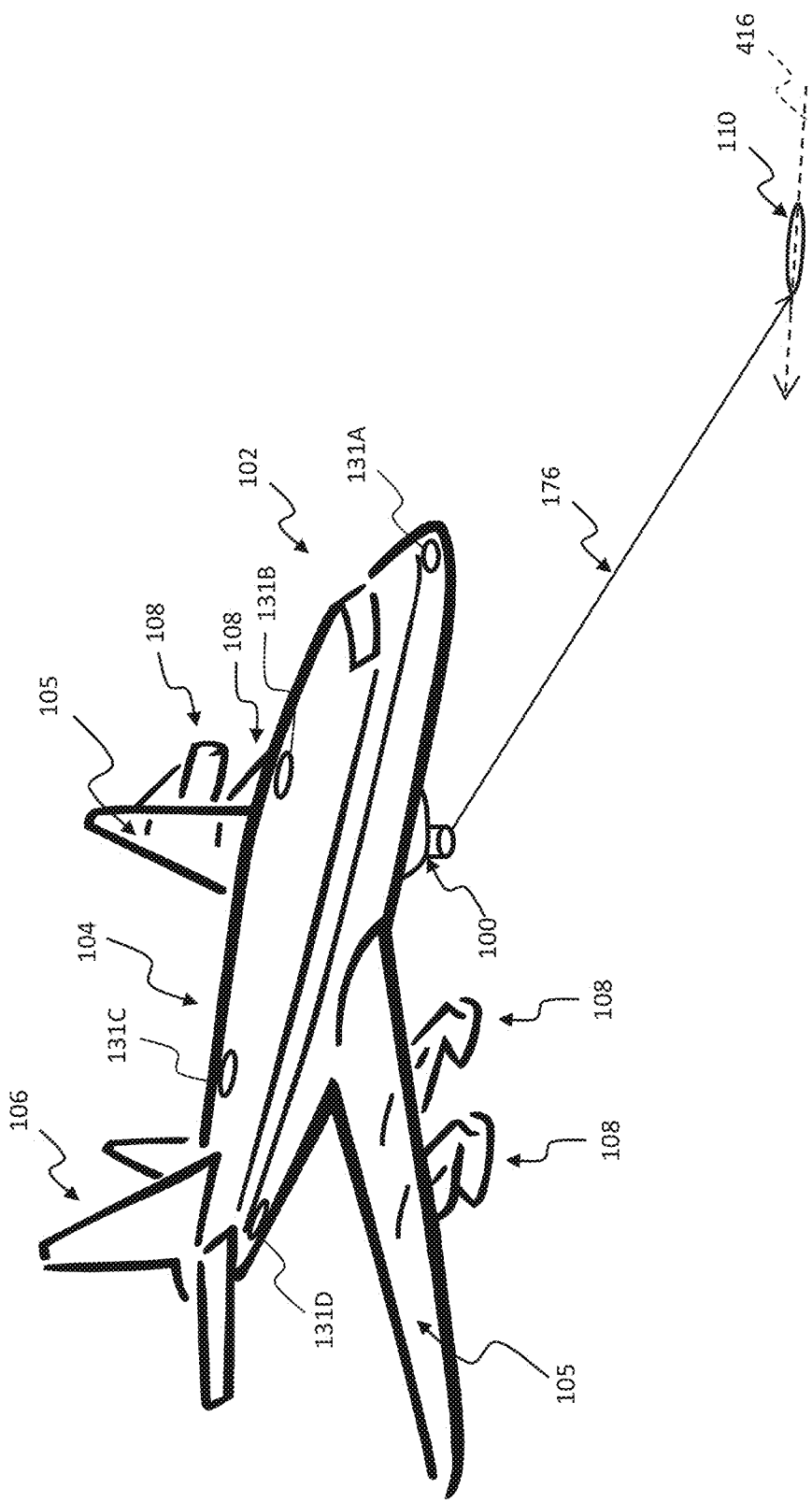
FIG. 2B illustrates the mobile tracking device changing its direction of travel to a second direction due to the optical energy directed from the countermeasure device at the mobile tracking device.
Figure 2D:
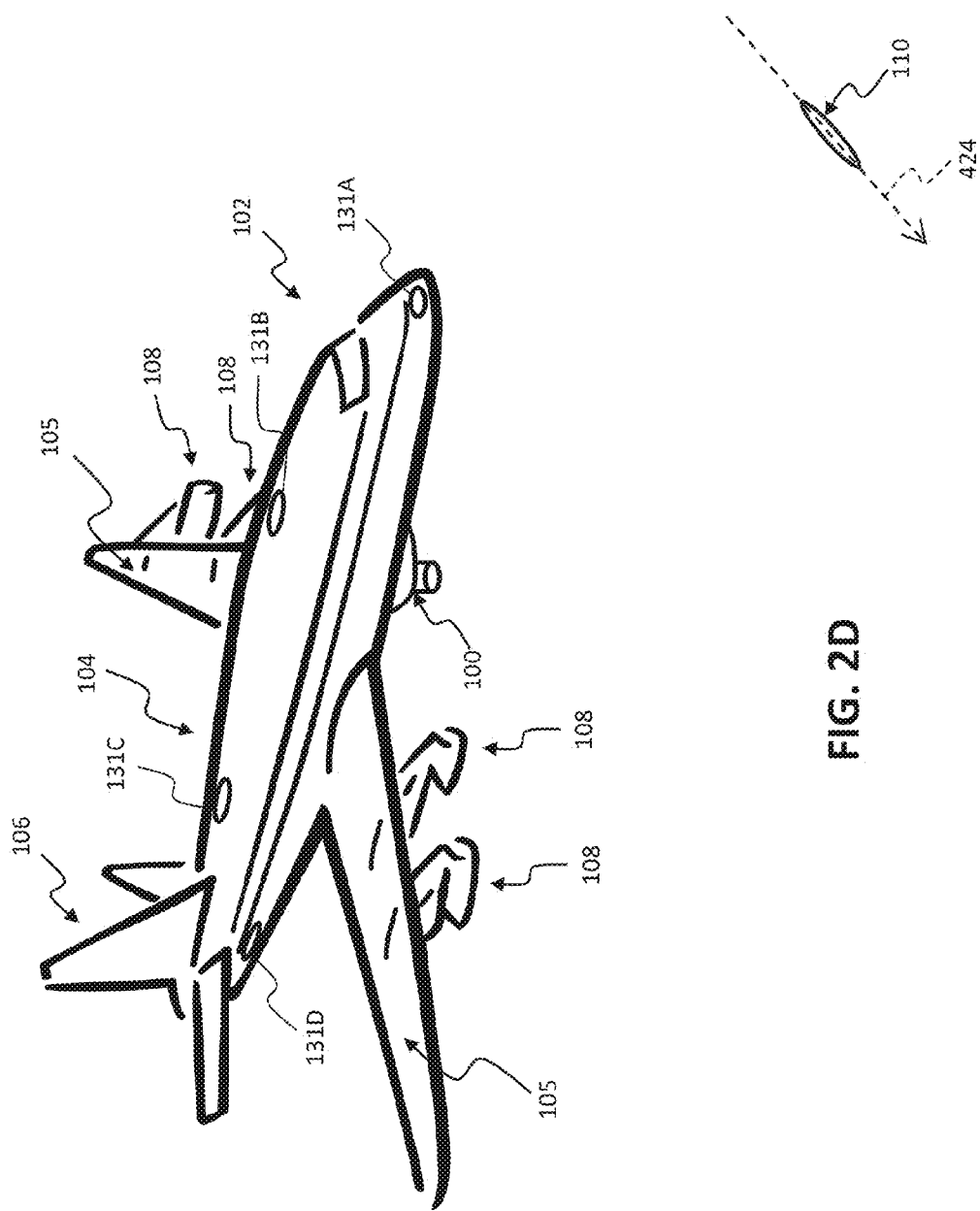
FIG. 2D illustrates the mobile tracking device changing its direction of travel to a fourth direction due to the optical energy directed from the countermeasure device at the mobile tracking device.
Figure 16:
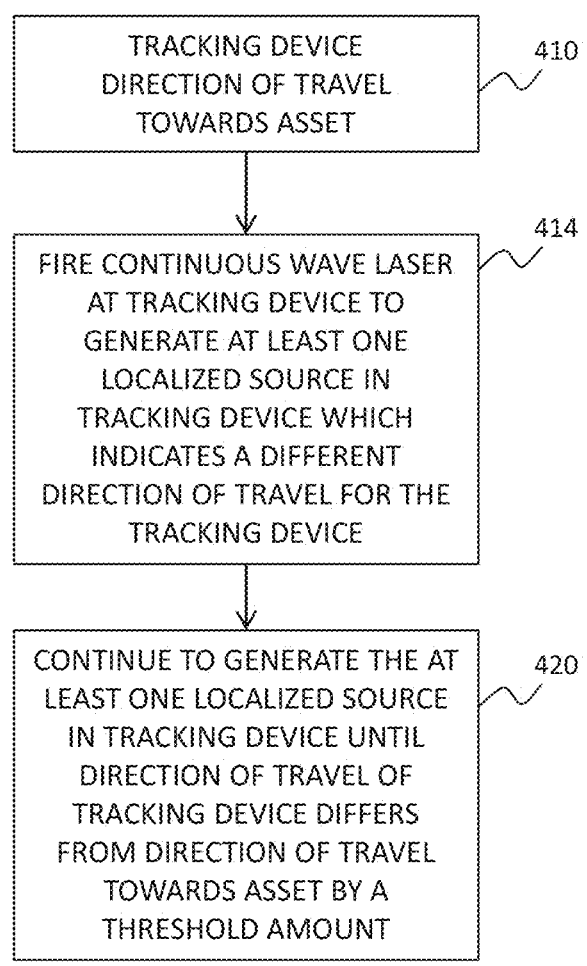
FIG. 16 illustrates a method of countering a mobile tracking device with a countermeasure device.

Referring to FIG. 16, mobile tracking device 110 is traveling in a direction towards asset 102, as represented by block 410. This is illustrated in FIG. 2A wherein an airborne mobile tracking device 110 is shown traveling in direction 412 towards asset 102. As explained herein, countermeasure device 100 fires continuous wave laser 166 to direct output beam 176 towards mobile tracking device 110. This causes the generation of at least one localized source 400 within mobile tracking device 110 which is within a field of view of mobile tracking device 110. These one or more localized sources 400 are brighter than the infrared energy radiated from asset 102 and are generated at locations which do not correspond with the current direction 412 of mobile tracking device 110, as represented by block 414 in FIG. 16. As such, controller 116 attempts to point mobile tracking device 110 at the brighter source 400 and in doing so changes the direction of mobile tracking device 110 to direction 416 as shown in FIG. 2B. Beam control module 162 alters the direction of output beam 176 to coincide with the new direction of mobile tracking device 110, as represented by block 420 in FIG. 16. This again causes the generation of the localized sources 400 within mobile tracking device 110 which are within a field of view of mobile tracking device 110. As such, controller 116 attempts to point mobile tracking device 110 at the brighter source 400 and in doing so changes the direction of mobile tracking device 110 to direction 422 as shown in FIG. 2C. Beam control module 162 alters the direction of output beam 176 to coincide with the new direction of mobile tracking device 110. Once again this causes the generation of the localized sources 400 within mobile tracking device 110 which are within a field of view of mobile tracking device 110. As such, controller 116 attempts to point mobile tracking device 110 at the brighter source 400 and in doing so changes the direction of mobile tracking device 110 to direction 424 as shown in FIG. 2D. In moving beam control module 162 to track mobile tracking device 110 along the direction 424, rotatable head 184 exceeds the threshold rotation amount and continuous wave laser 166 is deactivated, as shown in FIG. 2D.

Unlike prior art countermeasure devices, countermeasure device 100 is not mobile tracking device 110 specific. Rather, countermeasure device 100 is effective against both imaging and non-imaging mobile tracking devices 110. Countermeasure device 100 relies on the continuous provision of optical energy into mobile tracking device 110 to produce localized sources 400 within the field of view of mobile tracking device 110 such that detector 118 is confused as to the location of asset 102.

In another example of the use of countermeasure device 100, a 3 kW, continuous wave, infrared, Ytterbium single mode fiber laser was used as continuous wave laser 166 of countermeasure device 100 associated with an asset 102. In tests, a plurality of different mobile infrared mobile tracking devices 110 were fired at asset 102 while asset 102 was at ground level. Countermeasure device each time 100 directed output beam 176 at the optical window of the respective mobile tracking device 110. The countermeasure device 100 was effective against all of the plurality of different mobile tracking device 110 at a range of up to about 1250 meters from countermeasure device 100. A computer model was made wherein asset 102 was at ground level, a wavelength of continuous wave laser 166 was set to 1.07 μm, and values for additional parameters countermeasure device 100 and mobile tracking device 110 were set. The computer model provided a predicted range of up to 1290 meters for a plurality of different mobile tracking device 110. This computer model demonstrated good agreement with the experimentally obtained range of up to 1250 meters.

In a further example of the use of countermeasure device 100, a 3 kilowatt, continuous wave, infrared, Ytterbium single mode fiber laser was used as continuous wave laser 166 of countermeasure device 100 associated with an asset 102. In tests, a specific mobile tracking device 110 was fired at asset 102 while asset 102 was at ground level. Countermeasure device 100 directed output beam 176 at the optical window of mobile tracking device 110. The countermeasure device 100 was effective against the specific mobile tracking device 110 at a range of up to about 2650 meters from countermeasure device 100. The above-mentioned computer model provided a predicted range of up to 2440 meters for the specific mobile tracking device 110. This demonstrates good agreement with the experimentally obtained range of up to 2650 meters.

Returning to FIG. 9, in one embodiment, beam pointing system 210 further includes a laser designator system 214. Laser designator system 214 includes a pulsed laser which is directed at mobile tracking device 110 and reflected therefrom. Based on the reflected signal, laser designator system 214 is able to determine a distance from countermeasure device 100 to mobile tracking device 110. In the case wherein countermeasure device 100 includes focusing optics 177 or wherein beam expander 172 may be focused, one of system controller 154 and beam pointing system 210 adjusts a focal length of focusing optics 177 to focus output beam 176 at the location of mobile tracking device 110. In one embodiment, output beam 176 is focused at a distance shorter than the determined range to mobile tracking device 110, the distance being chosen based on an estimated speed of mobile tracking device 110. In one embodiment, this distance corresponds to the expected position of mobile tracking device 110 based on assumptions regarding the relative difference in speed between asset 102 and mobile tracking device 110. In one embodiment, the estimated speed of mobile tracking device 110 is selected based on the type of mobile tracking device 110 which is identified based on a retro-reflection received from mobile tracking device 110.

Laser designator system 214, illustratively, has a separate optical window 215 through which the laser beam of laser designator system 214 is sent out of countermeasure device 100 and the reflection from mobile tracking device 110 is received to determine the distance to mobile tracking device 110. In one embodiment, laser designator system 214 uses the same optical window 190 as output beam 176 and is bore sighted to output beam 176.

In one embodiment, continuous laser 166 is replaced with a plurality of laser sources the output of which are combined by presenting the output of each proximate the focus of beam expander 172. In one embodiment, a first output fiber corresponding to a first laser source is surrounded by a plurality of output fibers from a respective plurality of laser sources. The outputs of each of the fibers are incoherently combined to scale the overall laser power to a high level which may be damage or destroy large targets. In one embodiment, the outputs at the input to beam expander 172 are positioned to produce a generally Gaussian beam in the far field of beam expander 172.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. An apparatus for use with an asset and for interacting with a mobile tracking device, the apparatus comprising:
 a pod configured to be attached to the asset, the pod including an optical window;
 a continuous wave fiber laser positioned within the pod; and
 a battery source operatively coupled to the continuous wave fiber laser and positioned within the pod, the battery source providing power to the continuous wave fiber laser to produce a continuous beam of optical energy.

2. The apparatus of claim 1, wherein the pod includes a rotatable head having an optical window through which the continuous beam of optical energy exits the pod.

3. The apparatus of claim 1, further comprising a battery charger positioned within the pod and coupled to a power source of the asset, the battery charger charging the battery source when the asset is operating in a low power mode.

4. The apparatus of claim 1, further comprising a system cooling module positioned within the pod, the system cooling module providing cooling fluid to the continuous wave fiber laser.

5. The apparatus of claim 1, further comprising a laser designator positioned within the pod, the laser designator determining a distance from the pod to the mobile tracking device.

6. The apparatus of claim 5, wherein the continuous beam of optical energy is focused at a distance shorter than the distance from the pod to the mobile tracking device determined by the laser designator.

* * * * *